(12) United States Patent
Shinoda et al.

(10) Patent No.: US 10,615,714 B2
(45) Date of Patent: Apr. 7, 2020

(54) MODULE FOR CONTROLLING THE INTERNAL ENERGY OF A CONVERTER

(71) Applicants: SUPERGRID INSTITUTE, Villeurbanne (FR); CENTRALESUPELEC, Gif-sur-Yvette (FR)

(72) Inventors: Kosei Shinoda, Lyons (FR); Abdelkrim Benchaib, Montigny le Bretonneux (FR); Xavier Guillaud, Bachy (FR); Jing Dai, Gif-sur-Yvette (FR)

(73) Assignees: SUPERGRID INSTITUTE, Villeurbanne (FR); CENTRALESUPELEC, Gif-sur-Yvette (FR)

( * ) Notice: Subject to any disclaimer, the term of this patent is extended or adjusted under 35 U.S.C. 154(b) by 0 days.

(21) Appl. No.: 16/313,951

(22) PCT Filed: Jul. 3, 2017

(86) PCT No.: PCT/FR2017/051803
§ 371 (c)(1),
(2) Date: Dec. 28, 2018

(87) PCT Pub. No.: WO2018/007741
PCT Pub. Date: Jan. 11, 2018

(65) Prior Publication Data
US 2019/0190399 A1 Jun. 20, 2019

(30) Foreign Application Priority Data
Jul. 5, 2016 (FR) .................................. 16 56432

(51) Int. Cl.
*H02M 7/483* (2007.01)
*H02M 7/00* (2006.01)
*H02M 1/00* (2006.01)

(52) U.S. Cl.
CPC .......... *H02M 7/483* (2013.01); *H02M 7/003* (2013.01); *H02M 2001/0009* (2013.01); *H02M 2007/4835* (2013.01)

(58) Field of Classification Search
CPC ................ H02M 7/483; H02M 7/003; H02M 2001/0009; H02M 2007/4835
See application file for complete search history.

(56) References Cited

U.S. PATENT DOCUMENTS

| | | | |
|---|---|---|---|
| 2013/0148392 A1* | 6/2013 | Inoue | H02M 7/10 363/68 |
| 2014/0003101 A1* | 1/2014 | Tang | H02M 1/14 363/40 |
| 2015/0062991 A1 | 3/2015 | Zhang | |

OTHER PUBLICATIONS

S. Samini et Al, Control of DC bus voltage with a modular Multilevel Convertor », 2015 IEEE Eindhoven Powertech, Jun. 1, 2015 (Jun. 1, 2015), pp. 1-6, WP055278812, DOI: 10.1109/PTC.2015.7232570 ISBM: 978-1-4799-7693-5.

(Continued)

*Primary Examiner* — Kyle J Moody
(74) *Attorney, Agent, or Firm* — Workman Nydegger

(57) ABSTRACT

The invention relates to a modular multilevel converter (10) including a control module (12) for regulating the internal energy stored in the capacitors of the submodules of an arm of the converter, the control module being suitable for limiting the internal energy to below an upper limit and/or to above a lower limit, by using parameters measured on the DC power supply network (110) and on the AC power supply network (120) together with setpoints for the operating power of the converter.

21 Claims, 11 Drawing Sheets

(56) References Cited

OTHER PUBLICATIONS

Guo Jie et Al "Energy storable VSC-HVDC system based on modular multilevel convertor" International Journal of Electrical Power & Energy Systems, Jordan Hill, Oxford, GB, vol. 78, Dec. 17, 2015 (Dec. 17, 2015), pp. 269-276, XP029404255, ISSN: 0142-0615, DOI: 10.1016/J.IJEPES.2015.11.074.

* cited by examiner

MODULE FOR CONTROLLING THE INTERNAL ENERGY OF A CONVERTER

BACKGROUND

The present disclosure relates to the technical field of modular multilevel converters (MMC) that convert alternating current (AC) into direct current (DC), and vice versa.

The disclosure relates more precisely to high voltage direct current (HVDC) transport networks that use DC for transmitting electricity and in which stations incorporate modular multilevel converters.

In FIG. 1, there can be seen a diagram showing a set 6 of submodules of a multilevel modular converter 10 of the prior art. For three-phase input/output (having three phases $\varphi_a$, $\varphi_b$, and $\varphi_c$), the converter 10 has three conversion legs, which are referenced by the indices a, b, and c given to the various components of FIG. 1. Each conversion leg comprises an upper arm and a lower arm (specified by the indices "u" for upper and "l" for lower), each of which connects one of the terminals DC+ or DC− of the DC power supply network to a terminal of the AC power supply network. In particular, each of the legs is connected to one of the three phase lines $\varphi_a$, $\varphi_b$, and $\varphi_c$, of the AC power supply network. FIG. 1 shows a set 6 of submodules, in which each arm passes a current $i_{xi}$ (with x specifying whether the arm is upper or lower, and with the index i specifying the leg). Also, in addition, each arm comprises a plurality of submodules $SM_{xij}$ that may be controlled with a desired sequence (where x specifies whether the arm is upper or lower, i specifies the phase line with which the arm is associated, and j is the number of the submodule from among the submodules in series in the arm). In this example, only three submodules are shown per arm. In practice, each lower or upper arm may have a number N of submodules that may lie in the range a few tens to a few hundreds. Each submodule $SM_{xij}$ includes an energy storage system such as at least one capacitor with a control member for selectively connecting the capacitor in series between the terminals of the submodule or for bypassing it. The submodules are controlled with a sequence that is selected so as to cause the number of energy storage elements that are connected in series in an arm of the converter 10 to vary progressively in order to deliver a plurality of voltage levels. Also, in FIG. 1, $V_{dc}$ designates the voltage across the points where the converter is connected to the DC power supply network, with these points being known to the person skilled in the art as the "point of common coupling" (PCC). $i_{dc}$ designates the current of the DC power supply network, while currents $i_{ga}$, $i_{gb}$, and $i_{gc}$ are carried by the three phase lines $\varphi_a$, $\varphi_b$, and $\varphi_c$. Furthermore, each arm possesses an inductance $L_{arm}$, and each phase line has an inductance $L_f$ and a resistance $R_f$.

FIG. 2 shows a prior art submodule $SM_{xij}$ forming part of the FIG. 1 converter 10. In this submodule, each control member comprises a first electronic switch element T1 such as an insulated gate bipolar transistor (IGBT) connected in series with an electrical energy storage element, specifically a capacitor $C_{SM}$. This first switch element T1 and this capacitor $C_{SM}$ are connected in parallel with a second electronic switch element T2, likewise an IGBT. This second electronic switch element of T2 is coupled between the inlet and outlet terminals of the submodule $SM_{xij}$. Both of the first and second switch elements T1 and T2 are associated with respective antiparallel diodes, shown in FIG. 2.

In operation, the submodule may be controlled to occupy two control states.

In a first state, referred to as the "on" state, the first switch element T1 and the second switch element T2 are configured to connect the energy storage element $C_{SM}$ in series with the other submodules. In a second state, referred to as the "off" state, the first switch element T1 and the second switch element T2 are configured to short-circuit the energy storage element $C_{SM}$.

It is known that each arm having a voltage $v_m$ across its terminals, can be modeled by a modeled voltage source having a voltage $v_m$ across its terminals, with a duty factor that depends on the number of submodules that are on, and by a modeled capacitor $C_{tot}$ connected to the voltage source. This model is shown diagrammatically in FIG. 3, where there can be seen an arm passing a current i together with the model that is obtained. The reciprocal of the equivalent capacitance of the modeled capacitor $C_{tot}$ is equal to the sum of the reciprocals of the capacitances of the modules that are on, such that:

$$\frac{1}{C_{tot}} = \frac{1}{C_1} + \frac{1}{C_2} + \cdots + \frac{1}{C_N}$$

where $C_1, C_2, \ldots, C_j, \ldots, C_N$ is the capacitance of the $j^{th}$ capacitor.

Thus, the voltage $v_{c\Sigma}$ across the terminals of the modeled capacitor $C_{tot}$ is equal to the sum of the voltages $v_{cj}$ across the terminals of the capacitors of the submodules in the arm (with j lying in the range 1 to N and giving the number of the capacitor and thus of the submodule). Also, each capacitor $C_{tot}$ passes a current $i_m$. In the present application, by misuse of language, $C_{tot}$ designates both the modeled capacitor and also its capacitance. By controlling the on/off sequence of the submodules, so as to cause the number of energy storage elements that are connected in series to vary progressively, it is possible to decrease or to increase the energy of the modeled capacitor $C_{tot}$ and thus the voltage across the terminals of each modeled voltage source.

In the prior art, there is thus to be found a configuration equivalent to the set 6 of submodules of the MMC 10 as shown in FIG. 4. In this figure, the converter is a converter analogous to the converter described with reference to FIG. 1, and in which each arm has been replaced by its model. Also, each phase line of the AC power supply network is associated with a current $i_{gi}$ and a voltage $v_{gi}$ (where the index i specifies the number of the leg).

In this example, each of the modeled voltage sources has a voltage $v_{mxi}$ across its terminals, and each of the modeled capacitors $C_{tot}$ passes a current $i_{mxi}$ and has across its terminals a voltage $v_{c\Sigma xi}$ (where x specifies whether the arm is upper or lower and where i specifies the number of the leg). It can also be observed that it is possible to subdivide the MMC into a notional AC portion and a notional DC portion (at the inlet or the outlet, depending on whether the converter is configured to convert AC energy into a DC energy, or vice versa), in which the variation in the total energy stored in the capacitors of the submodules is equal to the difference between the power entering the converter and the power leaving it.

In this type of MMC, it is known that the internal energy stored in the capacitors of the submodules is decoupled from the voltage of the DC power supply network. Thus, the internal energy stored in the capacitors of MMCs can be regulated independently. This makes it possible in particular for MMCs to contribute to stabilizing associated DC and AC power supply networks by delivering or extracting energy to or from said power supply networks.

It can thus be understood that the exchanges of power between the DC and/or AC power supply networks and the MMC lead to an increase or to a decrease in the internal energy stored in the capacitors of the converter.

The internal energy of the converter has an impact on the stability of the DC and AC power supply networks. Also, it is known that the total voltage of the capacitors of the converter is caused to oscillate as a result of exchanges of power between the DC and AC power supply networks. These oscillations have the consequence of threatening proper operation of the converter by not complying with its operating constraints. Prior art solutions do not take these oscillations into account, thereby running the risk of damaging the converter. Those solutions therefore do not make it possible to take full advantage of the capabilities of MMCs in terms of controlling the internal energy of the converter.

SUMMARY

An object of the present disclosure is to propose a modular multilevel converter (MMC) that remedies the above-mentioned problems and that makes it possible to use fully the potential of the MMC.

To do this, embodiments of the disclosure provide a modular multilevel voltage converter for converting an AC voltage into a DC voltage, and vice versa, the converter comprising a DC portion for connection to a DC power supply network and an AC portion for connection to an AC power supply network, the converter comprising a plurality of legs, each leg comprising an upper arm and a lower arm, each arm comprising a plurality of submodules that are individually controllable by a control member specific to each submodule, and each submodule comprising a capacitor connectable in series in the arm when the control member of the submodule is in an "on" state.

According to a general characteristic of the converter, said converter includes a control module configured to regulate the internal energy stored in the capacitors of the submodules of an upper or lower arm of the converter, the control module being suitable for limiting said internal energy to below an upper limit and/or to above a lower limit, by using parameters measured on the DC power supply network and on the AC power supply network together with setpoints for the operating power of the converter.

Preferably, and in nonlimiting manner, the submodules are controlled by means of two insulated gate bipolar transistors (IGBTs) serving to connect or not connect the capacitor of said submodule in series with the associated arm, depending on whether it is desired to place the submodule in the "on" state or in the "off" state.

Each arm can be modeled by a modeled voltage source associated in parallel with a modeled capacitor of capacitance $C_{tot}$. The sum of the voltages of the capacitors of the submodules of an arm is written $v_{c\Sigma}$, such that the voltage across the terminals of the modeled capacitor associated in parallel with the modeled voltage source is equal to $v_{c\Sigma}$. In addition, the modeled voltage source has a voltage $v_m$ across its terminals, also referred to as the "inserted" voltage as inserted into an arm, and it is characterized by a duty factor that depends on the number of controlled submodules.

Preferably, the duty factor, $\alpha$, that is associated with the modeled voltage source is calculated from the expression:

$$\alpha = \frac{n}{N}$$

where n is the number of submodules in the "on" state in the associated arm, and where N is the number of submodules in the arm.

It can be understood that said lower and/or said higher limit for the internal energy is/are determined so as to keep the internal energy stored in the capacitors of the submodules of the converter at a level that is appropriate for proper operation of said converter. This serves to avoid damaging the converter and enables full use to be made of its capabilities.

Without going beyond the ambit of the disclosure, the control module may be configured to regulate the internal energy solely to below the upper limit, solely to above the lower limit, or indeed to between an upper limit and a lower limit.

Also, said lower limit and/or said upper limit for the internal energy may be selected in such a manner as to take account of the oscillations in the total voltage of the capacitors. Thus, in spite of these inevitable oscillations, the internal energy is kept by the control module above said lower limit and/or below said upper limit so that the operation of the converter is not disturbed.

Preferably, the lower limit for the internal energy is determined from a condition to be satisfied relating to the inserted voltage $v_m$. Specifically, in order to guarantee proper operation of the converter, the inserted voltage $v_m$ as inserted in the arm is physically limited by the sum of the voltages $v_{c\Sigma}$ of the submodules in that arm. Thus, in order to satisfy this physical constraint, the inserted voltage setpoint $v_m^*$ must at all instants t satisfy the following inequality:

$$\frac{v_m^*(t)}{v_{c\Sigma}(t)} \le 1$$

where $$\frac{v_m^*(t)}{v_{c\Sigma}(t)}$$

designates the modulation index m.

The control module of the disclosure enables the internal energy to be regulated in such a manner as to comply with this inequality, even in the event of an oscillation peak for the total voltage of the capacitors.

Also preferably, the upper limit for the internal energy is determined from the voltage limit for the switch elements of the submodules. Specifically, in order to guarantee proper operation of the converter, the voltage $v_{cj}$ across a capacitor of a submodule must at each instant t be less than a maximum voltage $v_{c\ Max}$ corresponding to the voltage limit for the switch elements of said submodule, as given by:

$v_{ci}(t) \le V_{c\ Max}$ and thus:

$v_{c\Sigma}(t) \le N v_{c\ Max}$

In particular, this voltage limit for the switch elements presents a safety margin referred to as the "safe voltage limit".

When the internal energy reaches the upper limit or the lower limit, the control module corrects the internal energy so as to bring it back respectively to below the upper limit or to above the lower limit.

By using parameters measured on the DC power supply network and on the AC power supply network, the control module determines the lower limit and/or the upper limit for the internal energy by adapting itself to the states of the DC and AC power supply networks. It can be understood that the lower limit and/or the upper limit are not constant and that they vary with the states of the power supply networks.

Preferably, but in nonlimiting manner, these parameters are measured in real time on the power supply networks, such that the lower limit and/or the upper limit are servo-controlled in real time and are adapted to the states of the power supply networks at each instant. An advantage of this preferred embodiment is to improve specifically the accuracy of the determined limit(s), thereby reducing the risks of damaging the converter.

Also, using operating power setpoints for the converter makes it possible likewise to take account of the operating points of the converter in order to determine the lower limit and/or the upper limit. In this way, the internal energy and the capabilities of the converter for storing said internal energy are controlled better, thereby making greater use of the potential of the MMC.

In advantageous manner, said parameters measured on the DC power supply network and on the AC power supply network comprise a voltage value $v_g$ measured on the AC power supply network and a voltage value $V_{dc}$ measured on the DC power supply network. $v_g$ and $V_{dc}$ represent the operating states respectively of the AC power supply network and of the DC power supply network.

Preferably, the setpoints for the operating power of the converter comprise an active AC power setpoint $P_{ac}^*$, a reactive AC power setpoint $Q_{ac}^*$, and a DC power setpoint $P_{dc}^*$. The setpoints represent the operating points of the converter in terms of power.

In advantageous manner, the control module is configured to calculate intermediate variables as a function of said parameters measured on the DC power supply network and on the AC power supply network and also as a function of said setpoints for the operating power of the converter. In nonlimiting manner, mathematical analysis can be used to determine the mathematical relationships associating said intermediate variables with said parameters and with said power setpoints. Preferably, in order to simplify the mathematical analysis, it is assumed that the control module is a control loop that is fast enough for the setpoints to approximate the real values with which they are associated.

Advantageously, the intermediate variables include an equivalent differential current variable $I_{diff}$, representing the contribution of one phase in a balanced three-phase system to the current of the DC power supply network under steady conditions, as determined by means of the function:

$$I_{diff} = \frac{P_{dc}}{3V_{dc}}$$

Preferably, the intermediate variables include an equivalent differential voltage variable $V_{diff}$, representing the voltage across the terminals of the DC portion of the converter under steady conditions, as determined by means of the function:

$$V_{diff} = \frac{V_{dc}}{2} - I_{diff} R_{arm}$$

where $R_{arm}$ is the resistance in an arm of the converter.

In advantageous manner, the intermediate variables include an equivalent intermediate current variable $I_g$ representing the current flowing to the AC electrical power supply network under steady conditions, as determined by the function:

$$I_g = \frac{\sqrt{P_{ac}^2 + Q_{ac}^2}}{3V_g}$$

where $V_g$ represents the voltage of the AC power supply network under steady conditions.

Preferably, the intermediate variables also include a phase variable $\theta$ for the phase difference between the voltage vector of the AC power supply network and the vector of the current flowing to the AC power supply network. Also, $\theta$ may be determined from:

$$\theta = \tan^{-1}\left(-\frac{Q_{ac}}{P_{ac}}\right) \text{ if } P_{ac} > 0$$

$$\theta = \tan^{-1}\left(-\frac{Q_{ac}}{P_{ac}}\right) + \pi \text{ if } P_{ac} < 0$$

Advantageously, the intermediate variables include an intermediate angle variable $\delta$, representing the phase difference between the voltage vector of the AC power supply network under steady conditions and the vector of an equivalent AC internal voltage synthesized by the converter under steady conditions, $\delta$ being determined by means of the function:

$$\delta = \tan^{-1} \frac{X_{eq} P_{ac} - R_{eq} Q_{ac}}{R_{eq} P_{ac} + X_{eq} Q_{ac} + 3V_g^2}$$

where $V_g$ is the voltage of the AC power supply network under steady conditions, $R_{eq}$ is the equivalent resistance in an arm, and $X_{eq}$ is the equivalent reactance in an arm.

In nonlimiting manner, we write $$R_{eq} = R_f + \frac{R_{arm}}{2} \text{ and } X_{eq} = X_f + \frac{X_{arm}}{2} = \omega L_f + \frac{\omega L_{arm}}{2}$$

where, $L_{arm}$ and $R_{arm}$ designate respectively the inductance and the resistance in an arm, while $L_f$ and $R_f$ designate respectively the inductance and the resistance in a phase line, and $\omega$ is the angular frequency.

Preferably, the intermediate variables include an equivalent AC internal voltage variable $V_v$ as synthesized by the converter under steady conditions by means of the function:

$$V_v = \sqrt{\left(\frac{R_{eq}P_{ac} + X_{eq}Q_{ac}}{3V_g} + V_g\right)^2 + \left(\frac{X_{eq}P_{ac} - R_{eq}Q_{ac}}{3V_g}\right)^2}$$

where $V_g$ is the voltage of the AC power supply network under steady conditions, $R_{eq}$ is the equivalent resistance in an arm, and $X_{eq}$ is the equivalent reactance in an arm.

In a particularly advantageous aspect of the disclosure, the control module is configured to determine the oscillating component $W_{ru}^\Sigma(t)$ of the internal energy stored in the capacitors of an upper arm of the converter by means of the function:

$$W_{ru}^\Sigma(t) =$$
$$-\frac{\sqrt{2}\,I_{diff}V_v}{\omega}\sin(\omega t+\delta)+\frac{\sqrt{2}\,I_g V_{diff}}{2\omega}\sin(\omega t+\theta)-\frac{I_g V_v}{4\omega}\sin(2\omega t+\delta+\theta)$$

where $\omega$ is angular frequency. This oscillating component of the internal energy represents the intrinsic oscillations of the total voltage of the capacitors of an upper arm of the converter, and thus of the internal energy stored in said capacitors. These oscillations are caused by exchanges of power between the DC and AC power supply networks and the converter.

Also, the internal energy in an upper arm may be expressed as the sum of the oscillating component $W_{ru}^\Sigma(t)$ of the internal energy in that upper arm plus the average over time of the internal energy in that arm.

In a variant, the control module is configured to determine the oscillating component $W_{rl}^\Sigma(t)$ of the internal energy stored in the capacitors of an upper arm of the converter by means of the function:

$$W_{rl}^\Sigma(t) =$$
$$\frac{\sqrt{2}\,I_{diff}V_v}{\omega}\sin(\omega t+\delta)-\frac{\sqrt{2}\,I_g V_{diff}}{2\omega}\sin(\omega t+\theta)-\frac{I_g V_v}{4\omega}\sin(2\omega t+\delta+\theta)$$

In advantageous manner, the control module is configured to determine the oscillating component $W_{L\;min\;u}^\Sigma$ of the internal energy stored in the capacitors of the submodules of an upper arm of the converter by means of the function:

$$W_{Lminu}^\Sigma = \frac{C_{tot}}{2}\left(V_{diff}-\sqrt{2}\,V_v\cos(\omega t_m+\delta)\right)^2 - W_{ru}^\Sigma(t_m)$$

where $C_{tot}$ is the sum of the capacitances of the capacitors in the upper arm and where $t_m$ is a determined instant at which the internal energy in the upper arm reaches the lower limit $W_{L\;min\;u}^\Sigma$, with this instant being obtained by the formula:

$$t_m = \frac{1}{\omega}\left(\pi - \sin^{-1}\left(\frac{I_{diff}}{\sqrt{A_t^2+B_t^2}}\right) - \tan^{-1}\left(\frac{B_t}{A_t}\right)\right)+\frac{2k\pi}{\omega}$$

with:

$$A_t = \sqrt{2}\,\omega C_{tot}V_v\cos\delta + \frac{I_g}{\sqrt{2}}\sin\theta$$

$$B_t = \sqrt{2}\,\omega C_{tot}V_v\sin\delta - \frac{I_g}{\sqrt{2}}\cos\theta$$

In a variant, the control module is configured to determine the lower limit $W_{L\;min\;l}^\Sigma$ for the internal energy stored in the capacitors of the submodules of a lower arm of the converter. The expression for said lower limit $W_{L\;min\;l}^\Sigma$ can be determined by using symmetry between the upper and lower arms. In this expression, the values of the constraints are identical to the values of the constraints that apply to the upper arm.

Without going beyond the ambit of the disclosure, the lower limit for the internal energy stored in the capacitors of an upper or lower arm can be determined by using an approach that takes account of the most unfavorable configuration that is reached at the instant $t_m$, at which the following equation is satisfied:

$$\frac{v_m(t_m)}{v_{c\Sigma}(t_m)} = 1$$

In this unfavorable configuration, the internal energy in an upper or lower arm reaches said lower limit.

Advantageously, the control module is configured to determine the upper limit $W_{L\;max\;u}^\Sigma$ for the internal energy stored in the capacitors of the submodules of an upper arm of the converter by means of the function:

$$W_{Lmaxu}^\Sigma = \frac{C_{tot}}{2}(NV_{smMax})^2 - W_{ru}^\Sigma(t_r)$$

where $C_{tot}$ is the sum of the capacitances of the capacitors in the arm, $V_{sm\;Max}$ is the maximum voltage that is acceptable in a submodule, N is the number of submodules in the arm, and where $t_r$ is a determined instant at which the internal energy in the arm reaches the upper limit $W_{L\;max\;u}^\Sigma$, with this instant being obtained by the formula:

$$t_r = \frac{1}{\omega}\left(\cos^{-1}\left(-\frac{\sqrt{2}\,I_{diff}}{I_g}\right)-\theta\right)+\frac{2k\pi}{\omega}$$

In a variant, the control module is configured to determine the lower limit $W_{L\;max\;l}^\Sigma$ for the internal energy stored in the capacitors of the submodules of a lower arm of the converter. Once again, the expression for said lower limit $W_{L\;max\;l}^\Sigma$ can be determined by using symmetry between the upper and lower arms. In this expression, the values of the constraints are identical to the values of the constraints that apply to the upper arm.

Without going beyond the ambit of the disclosure, the lower limit for the internal energy stored in the capacitors of the submodules of an upper or lower arm can be determined by using an approach that takes account of the most unfavorable configuration that is reached at the instant $t_r$, at which the following equation is satisfied:

$$V_{c\Sigma}(t_r) = Nv_{c\;Max}$$

In this unfavorable configuration, the internal energy in an upper or lower arm reaches the upper limit for internal energy.

Preferably, the control module includes a determination module for determining said lower limit and said upper limit for the internal energy stored in the capacitors of the submodules of an upper or lower arm as a function of said voltage value $v_g$ as measured on the AC power supply network, of said voltage value $V_{dc}$ as measured on the DC power supply network, of said active AC power setpoint $P_{ac}^*$, of said reactive AC power setpoint $Q_{ac}^*$, and of said DC power setpoint $P_{dc}^*$.

By means of the determination module, the lower limit and/or the upper limit for the internal energy are servocontrolled, preferably in real time, as a function of the states of the power supply networks.

Also preferably, the control module includes a correction module for correcting an internal energy setpoint as a function of said upper limit and of said lower limit, as supplied by the control module. An advantage is to obtain an internal energy setpoint that is adapted to the conditions of the network and that ensures proper operation of the converter. This correction of the setpoint for the internal energy stored in the capacitors serves to improve control of the internal energy and to further improve management of the energy storage capabilities of the converter.

It can thus be understood that so long as the internal energy setpoint input to the correction module does not exceed said lower limit or said upper limit, said internal energy setpoint is not modified. The correction module then supplies as output an internal energy setpoint that is identical to the setpoint received as input.

In contrast, when the internal energy setpoint is lower than said lower limit or higher than said upper limit, the correction module corrects the setpoint so that it is higher than the lower limit or lower than the upper limit.

In a particularly advantageous aspect of the disclosure, the control module includes a regulator for regulating the internal energy of the converter, having as input an internal energy setpoint for the converter, and delivering a power setpoint for the capacitors of said converter. This internal energy regulator serves to regulate the internal energy stored in the capacitors of an upper or lower arm of the converter, by making it tend towards its setpoint.

In nonlimiting manner, the internal energy setpoint may be supplied by a correction module. By means of the internal energy regulator, it is thus possible to servocontrol the voltage across the terminals of each modeled capacitor and thereby control effectively the energy stored in the capacitors.

Preferably, the control module includes a regulator for regulating the power at the connection points between the converter and the AC network, having as inputs an AC active power setpoint $P_{ac}^*$ and an AC reactive power setpoint $Q_{ac}^*$, and delivering an AC current setpoint $i_{gd}^*$ and an AC current setpoint $i_{gq}^*$. The AC current setpoint id is associated with the AC power setpoint $P_{ac}^*$, while the AC current setpoint $i_{gq}^*$ is associated with the AC reactive power setpoint $Q_{ac}^*$. This regulator implements so-called "slow" regulation of the power at the connection points between the converter and the AC network.

Preferably, the control module includes a regulator for regulating the power at the connection points between the converter and the DC network, having as input a DC power setpoint $P_{dc}^*$, and delivering a differential current setpoint $i_{diff}^*$. This regulator implements so-called "slow" regulation of the power at the connection points between the converter and the DC network.

Also preferably, the control module includes a regulator for regulating the AC current $i_g$ of the AC power supply network, having as inputs an AC current setpoint $i_{gd}^*$ and an AC current setpoint $i_{gq}^*$ that are associated with the AC current $i_g$, and supplying as output an equivalent AC internal voltage setpoint $v_v^*$. $i_g$ is the current flowing in the AC power supply network. Regulating the AC current $i_g$ amounts to regulating the transfers of incoming or outgoing AC power, depending on the configuration of the converter. This regulator implements so-called "fast" regulation of the AC current $i_g$.

Advantageously, the control module includes a regulator for regulating the differential current $i_{diff}$, having as input a differential current setpoint $i_{diff}^*$ associated with the differential current $i_{diff}$ and supplying as output a differential voltage setpoint $v_{diff}^*$. Regulating the differential current $i_{diff}$ amounts to regulating the transfers of incoming or outgoing DC power, depending on the configuration of the converter. This regulator implements so-called "fast" regulation of the differential current $i_{diff}$, where $i_{diff}$ represents the differential current of the DC power supply network.

The disclosure also provides a method of controlling a modular multilevel voltage converter for converting an AC voltage into a DC voltage, and vice versa, the converter comprising a DC portion for connection to a DC power supply network and an AC portion for connection to an AC power supply network, the converter comprising a plurality of legs, each leg comprising an upper arm and a lower arm, each arm comprising a plurality of submodules that are individually controllable by a control member specific to each submodule, and each submodule comprising a capacitor connectable in series in the arm when the control member of the submodule is in an "on" state.

In characteristic manner, the method includes a step of regulating the internal energy stored in the capacitors of the submodules of an upper or lower arm of the converter, in which said internal energy is limited to below an upper limit and/or to above a lower limit, by using parameters measured on the DC power supply network and on the AC power supply network, together with setpoints for the operating power of the converter.

Preferably, the control method includes determining said lower limit and said upper limit for the internal energy stored in the capacitors of the submodules of an upper or lower arm of the converter as a function of said parameters measured on the DC power supply network and on the AC power supply network, and also as a function of operating power setpoints for the converter Preferably, the control method includes correcting an internal energy setpoint as a function of said upper limit and of said lower limit.

Also preferably, the control method includes regulating the internal energy of the converter, using as input an internal energy setpoint for the converter, and delivering a power setpoint for the capacitors of said converter.

In advantageous manner, the control method includes regulating the power at the connection points between the converter and the AC network by using as inputs an AC active power setpoint $P_{ac}^*$ and an AC reactive power setpoint $Q_{ac}^*$, and by delivering an AC current setpoint $i_{gd}^*$ and an AC current setpoint $i_{gq}^*$.

Advantageously, the control method includes regulating the power at the connection points between the converter and the DC network by using as input a DC power setpoint $P_{dc}^*$, and by delivering a differential current setpoint $i_{diff}^*$.

Preferably, the control method includes regulating the AC current $i_g$ by using as inputs an AC current setpoint $i_{gd}^*$ and an AC current setpoint $i_{gq}^*$ that are associated with the AC current $i_g$, and by supplying as output an equivalent AC internal voltage setpoint $v_v^*$.

Preferably, the control method includes regulating the differential current $i_{diff}$ using as input a differential current setpoint $i_{diff}^*$ associated with the differential current $i_{diff}$ and supplying as output a differential voltage setpoint $v_{diff}^*$.

Without going beyond the ambit of the disclosure, the control method may be performed by means of a converter as defined above in all of its embodiments, including its preferred embodiments.

BRIEF DESCRIPTION OF THE DRAWINGS

The disclosure can be better understood on reading the following description of an embodiment of the disclosure given as a nonlimiting example, and with reference to the accompanying drawings, in which.

DETAILED DESCRIPTION

Figure 5:
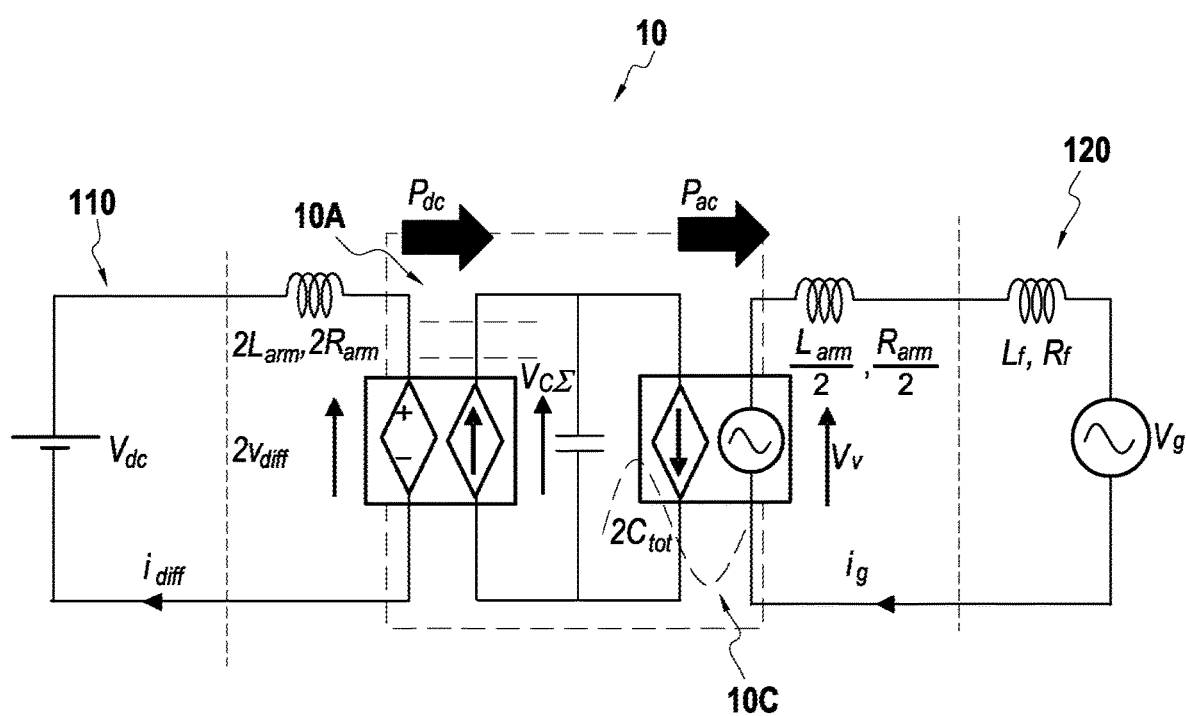
FIG. 5 is an equivalent and diagrammatic representation of a modular multilevel converter of the disclosure.
Figure 6:
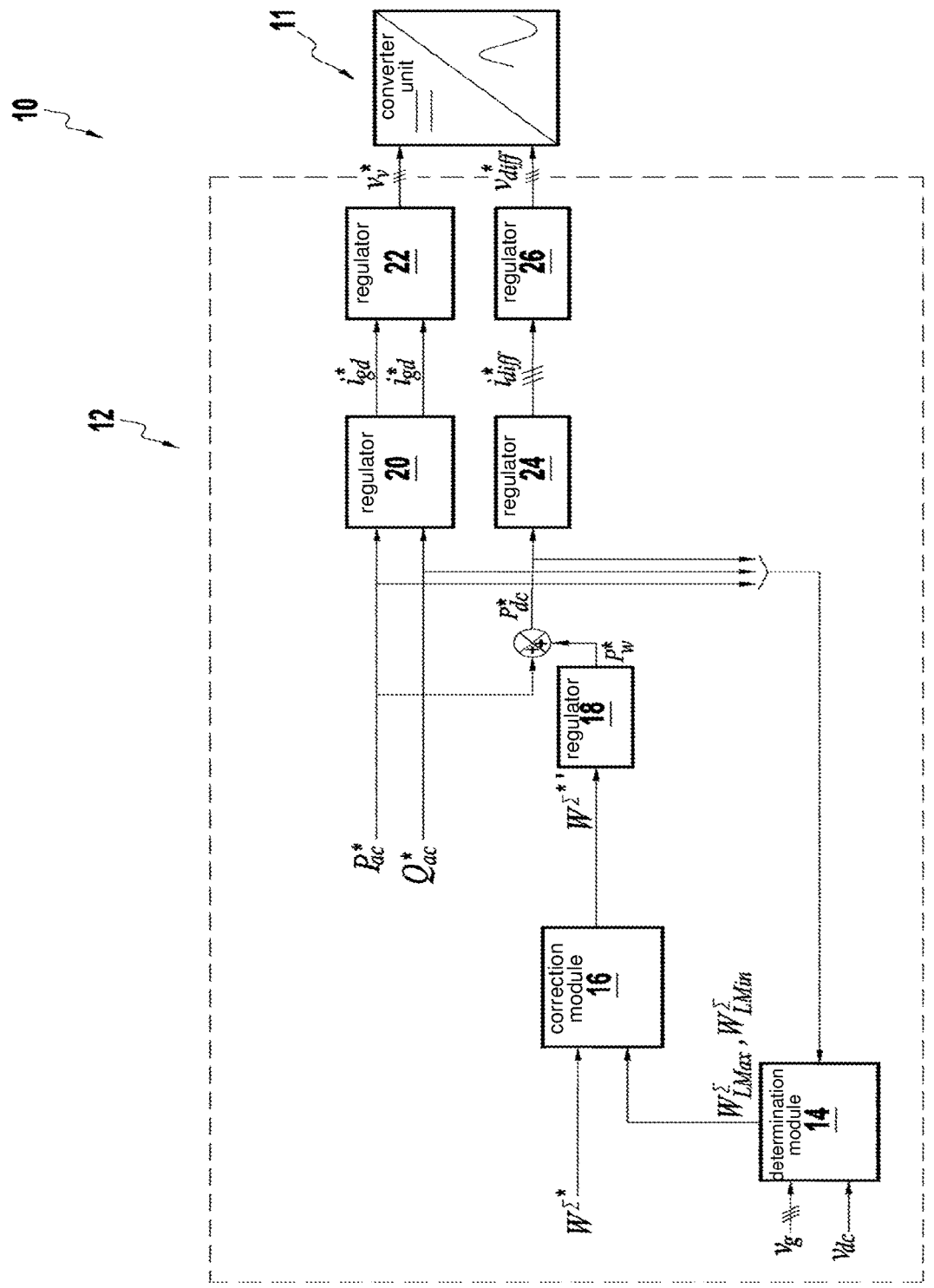
FIG. 6 shows a modular multilevel converter of the disclosure, including a control module.

An embodiment of the disclosure, shown in FIG. 6, relates to a modular multilevel converter 10 including a control module 12. FIG. 5 shows an equivalent circuit for the behavior of the converter 10 of the disclosure, in a single-phase model. FIG. 5 does not show the control module. Using a single-phase model also serves to simplify the notation and diagrams used. In this figure, and in nonlimiting manner, there can be seen an MMC 10 for converting DC energy into AC energy.

In this example, it can be seen that the converter 10 has a DC portion 10A that is connected to the DC power supply network 110 in the left-hand portion of the diagram. In the right-hand portion of the diagram, it can be seen that the converter 10 has an AC portion 10C connected to the AC power supply network 120. In FIG. 5, $L_{arm}$ and $R_{arm}$ designate respectively the inductance and the resistance in an arm, while $L_f$ and $R_f$ designate respectively the inductance and the resistance in a phase line. $i_{diff}$ designates the differential current passing through the DC power supply network, and $v_{diff}$ designates the differential voltage across the terminals of the DC portion of the converter. $i_g$ designates the current passing through the AC power supply network and $V_v$ designates the equivalent AC internal voltage across the terminals of the AC portion of the converter. $v_g$ designates the voltage of the AC power supply network, and $V_{dc}$ designates the voltage of the DC power supply network. Also, it can be seen that the power exchanged between the DC power supply network 110 and the converter 10 is written $P_{dc}$ and that the power exchanged between the converter 10 and the AC power supply network 120 is written $P_{ac}$.

Figure 1:
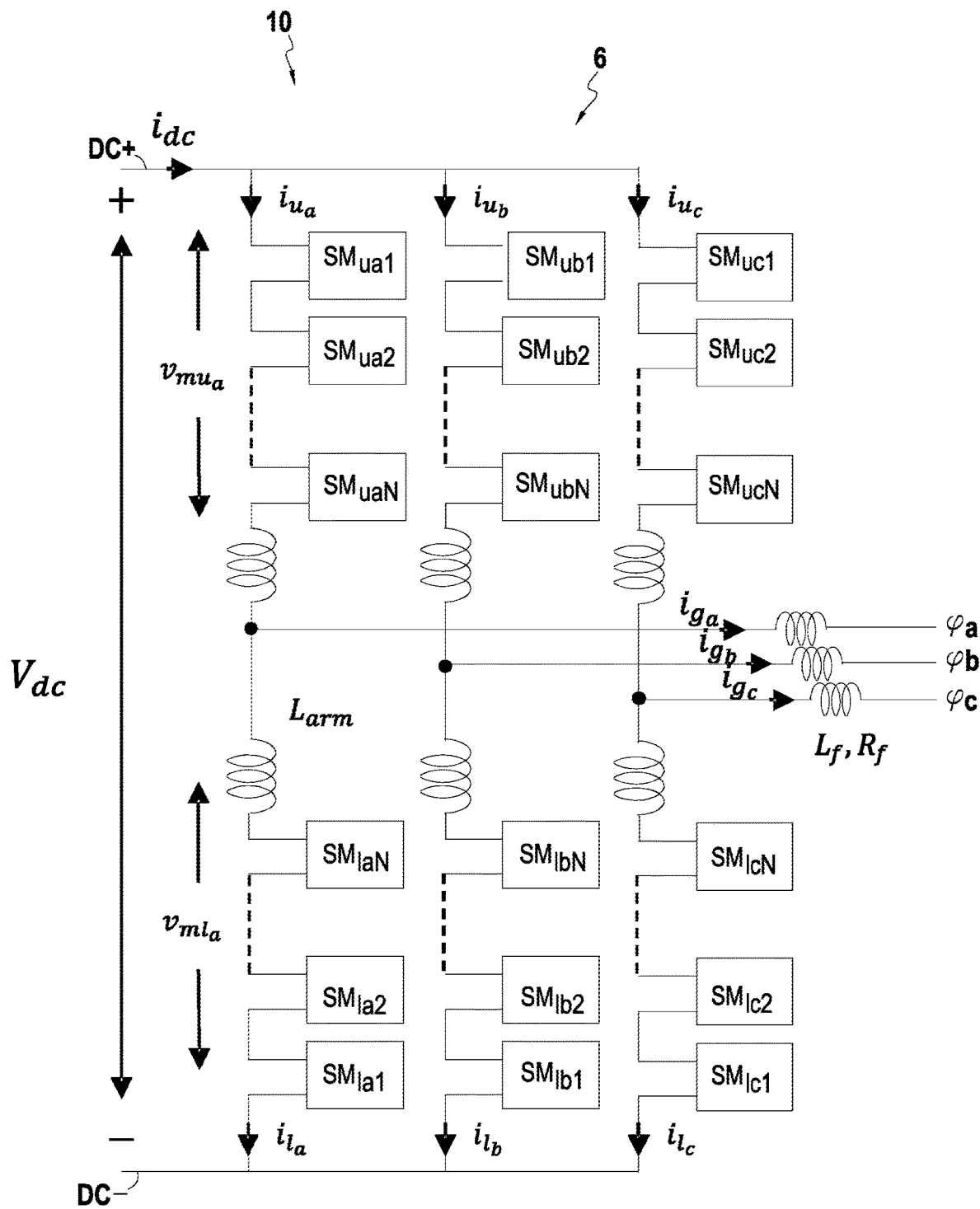
FIG. 1, described above, shows a three-phase modular multilevel converter of the prior art.
Figure 2:
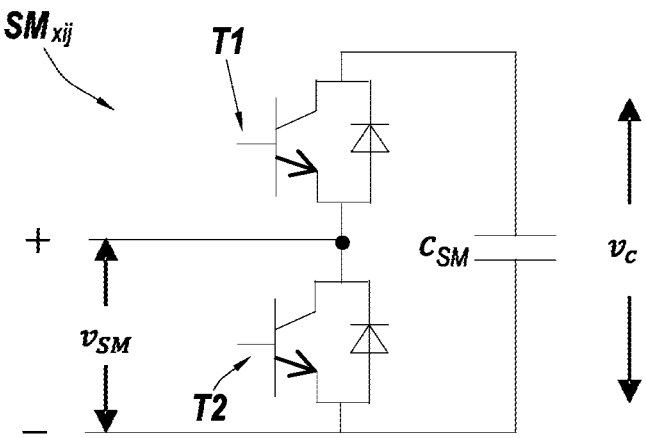
FIG. 2, described above, shows a submodule of a modular multilevel converter of the prior art.
Figure 3:
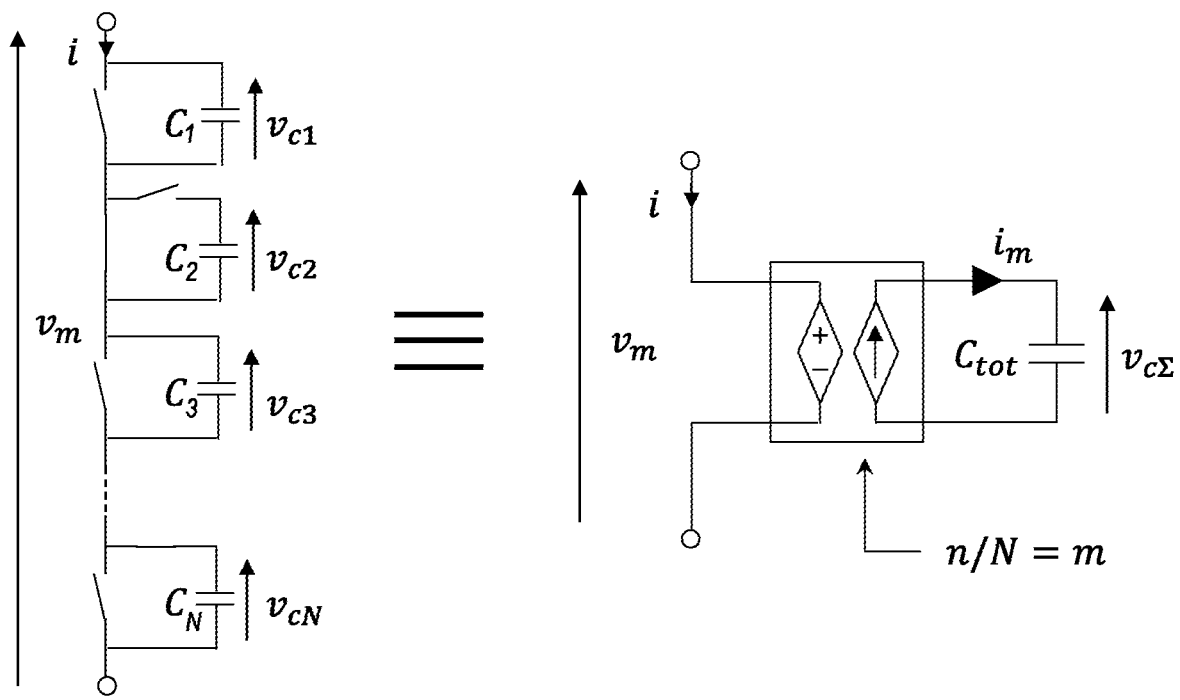
FIG. 3, described above, shows an equivalent circuit for an arm of a prior art MMC.
Figure 4:
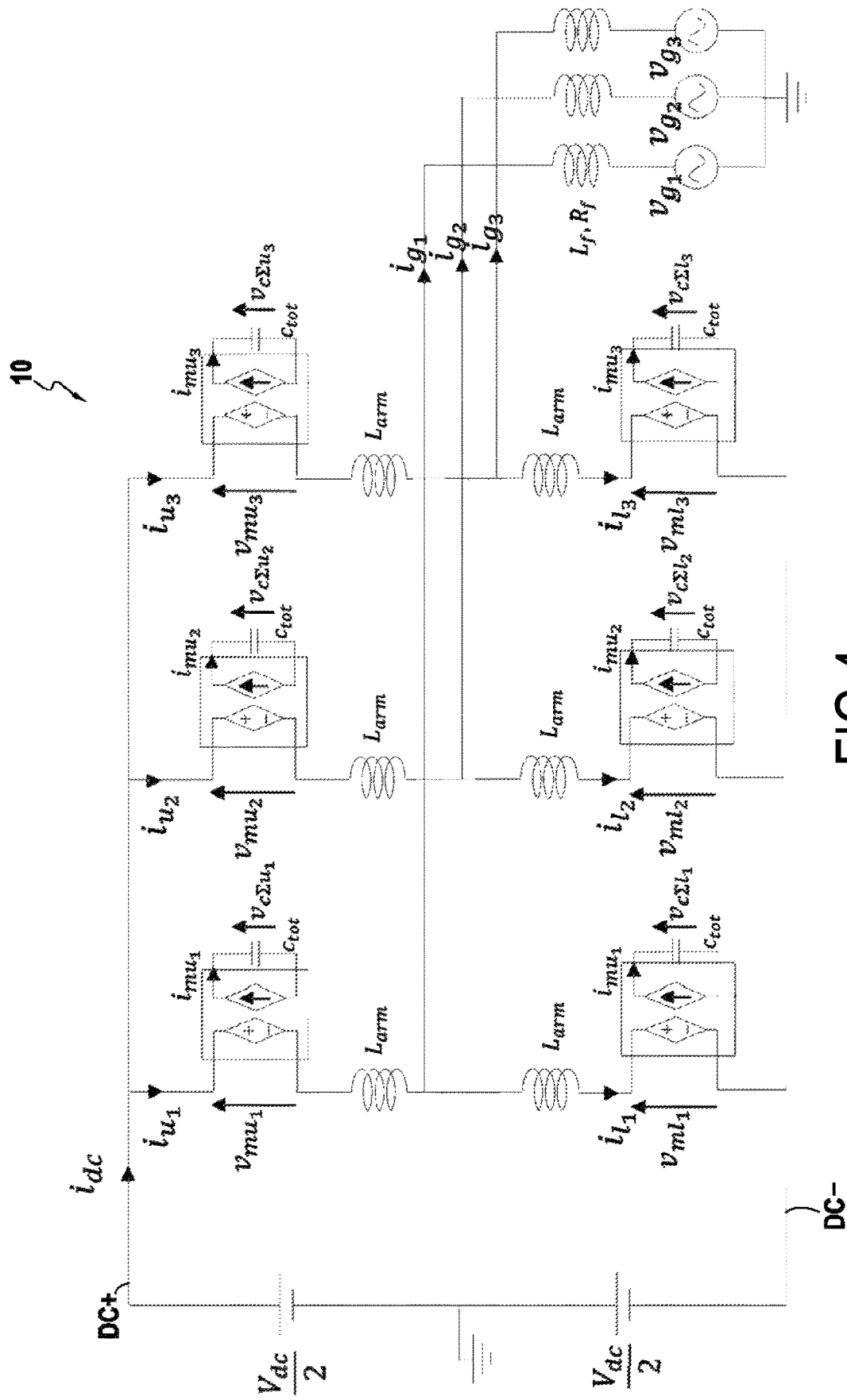
FIG. 4, described above, shows an equivalent configuration for a prior art modular multilevel converter.

FIG. 6 shows a modular multilevel converter 10 of the disclosure, comprising a converter unit 11 and a control module 12. The converter 10 of FIG. 6 has an identical structure of converter 10 shown in FIG. 1, including legs, arms, and submodules as shown therein. The control module 12 consists in a control loop and it is configured to regulate the internal energy stored in the capacitors of the submodules $SM_{xij}$ of an upper or lower arm of the converter. In the nonlimiting example of FIG. 6, the control module 12 is also suitable for limiting the internal energy stored in the capacitors of an upper or lower arm of the converter to below an upper limit $W_{L\ max}^{\Sigma}$ and to above a lower limit $W_{L\ min}^{\Sigma}$. The control module that serves to keep the internal energy between said upper limit $W_{L\ max}^{\Sigma}$ and said lower limit $W_{L\ min}^{\Sigma}$, thereby ensuring proper operation of said converter 10 without risk of damaging it.

As can be seen in the example of FIG. 6, the control module 12 also includes a determination module 14 for determining said lower limit $W_{L\ min}^{\Sigma}$ and said upper limit $W_{L\ max}^{\Sigma}$ for the internal energy of the converter. This determination module 14 receives as inputs a voltage value $v_g$ as measured on the AC power supply network 120, a voltage value $V_{dc}$ as measured on the DC power supply network 110, an active AC power setpoint $P_{ac}^{*}$, a reactive AC power setpoint $Q_{ac}^{*}$, and a DC power setpoint $P_{dc}^{*}$. It can be understood that the lower limit $W_{L\ min}^{\Sigma}$ and the upper limit $W_{L\ max}^{\Sigma}$ are not constant and that they vary with the states of the power supply networks.

Preferably, but in nonlimiting manner, the voltage values $v_g$ and $V_{dc}$ are measured in real time, such that the values for $W_{L\ max}^{\Sigma}$ and $W_{L\ min}^{\Sigma}$ are servocontrolled in real time and are adapted to the states of the power supply networks at all times. The operation of the determination module 14 is described in detail below.

In FIG. 6, it can also be seen that the control module 12 includes a correction module 16. In this nonlimiting example, the correction module 16 uses as input an internal energy setpoint $W^{\Sigma*}$ for the energy stored in the capacitors of an arm of the converter 10, together with the lower limit $W_{L\ min}^{\Sigma}$ and the upper limit $W_{L\ max}^{\Sigma}$ for internal energy as delivered by the determination module 14. The correction module 16 delivers as output a corrected internal energy setpoint $W^{\Sigma*\prime}$.

So long as the internal energy setpoint $W^{\Sigma*}$ input to the correction module 16 does not exceed said lower limit $W_{L\ min}^{\Sigma}$ or said upper limit $W_{L\ max}^{\Sigma}$, said internal energy setpoint $W^{\Sigma*}$ is not modified. The correction module 16 then delivers as output an internal energy setpoint $W^{\Sigma*\prime}$ that is identical to the internal energy setpoint $W^{\Sigma*}$ it receives as input. In contrast, when the internal energy setpoint $W^{\Sigma*}$ is lower than said lower limit $W_{L\ min}^{\Sigma}$ or higher than said upper limit $W_{L\ max}^{\Sigma}$, then the correction module 16 corrects the internal energy setpoint $W^{\Sigma*}$ in such a manner as to deliver as output a corrected internal energy setpoint $W^{\Sigma*'}$ that is higher than the lower limit or lower than the upper limit.

The control module 12 of FIG. 6 also includes a regulator 18 for regulating the internal energy of the converter 10. This regulator 18 for regulating the internal energy of the converter delivers a power setpoint $P_w^*$ for the capacitors of the converter 10, as determined from the corrected internal energy setpoint $W^{\Sigma*'}$ supplied by the correction module 16. The internal energy of the converter, as stored in the capacitors, is thus regulated, preferably in real time, by means of an internal energy setpoint $W^{\Sigma*'}$ that is corrected, preferably likewise in real time.

It may also be observed that, in this example, the control module 10 includes a regulator 20 for regulating the power at the connection points between the converter and the AC network. This regulator 20 for regulating the power at the connection points between the converter and the AC network receives as input an AC active power setpoint $P_{ac}^*$ and an AC reactive power setpoint $Q_{ac}^*$, and it delivers an AC current setpoint $i_{gd}^*$ and an AC current setpoint $i_{gq}^*$.

In nonlimiting manner, the control module 10 includes a regulator 22 for regulating the AC current $i_g$ of the AC power supply network 120 that receives as input an AC current setpoint $i_{gd}^*$ and an AC current setpoint $i_{gq}^*$ as supplied by the regulator 20 for regulating the power at the connection points between the converter and the AC network. This regulator 22 for regulating the AC current $i_g$ delivers as output, for the MMC 10, an equivalent AC internal voltage setpoint $v_v^*$.

Furthermore, in the example of FIG. 6, the active AC power setpoint $P_{ac}^*$, as used as input to the determination module 14, is also compared with and added to the power setpoint $P_w^*$ from the regulator 18 for regulating the internal energy of the converter 10. This comparison results in a DC power setpoint $P_{dc}^*$ supplied as input to a regulator 24 for regulating the power at the connection points between the converter and the DC network. This regulator 24 for regulating the power at the connection points between the converter and the DC network delivers a differential current setpoint $i_{diff}^*$, where $i_{diff}$ represents the differential current of the DC power supply network.

Still in nonlimiting manner, the control module 10 includes a regulator 26 for regulating the differential current $i_{diff}$ and receiving as input a differential current setpoint $i_{diff}^*$, associated with the differential current $i_{diff}$ as supplied by the regulator 24 for regulating the power at the connection points between the converter 10 and the DC network 110. The regulator 26 for regulating the differential current $i_{diff}$ supplies as output to the MMC 10 a differential voltage setpoint $v_{diff}^*$.

Figure 7:
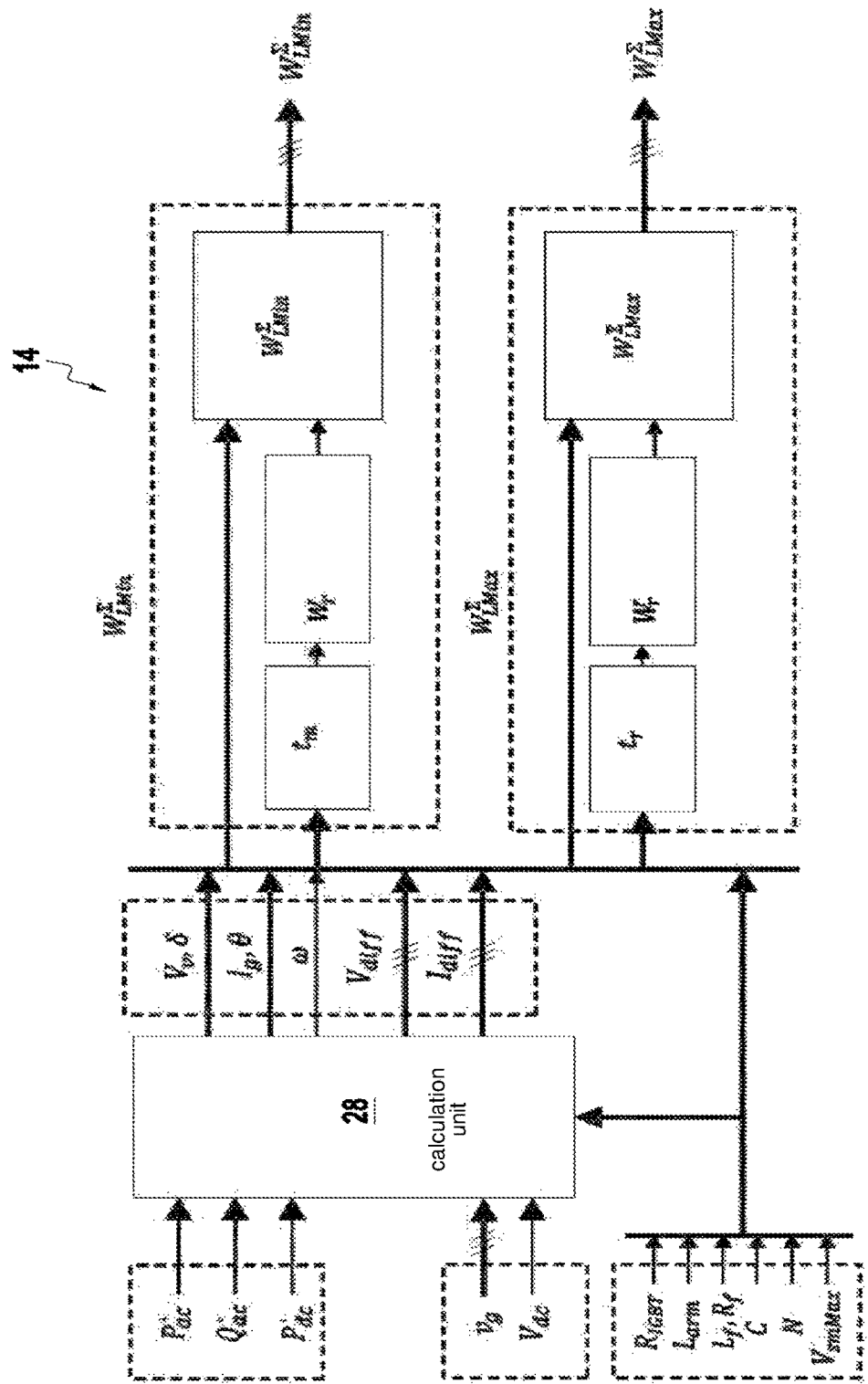
FIG. 7 shows a module for determining the upper limit and the lower limit for the internal energy stored in an arm of the FIG. 6 converter.

FIG. 7 shows the operation of the determination module 14 for determining the lower limit $W_{L\ min}^{\Sigma}$ and the upper limit $W_{L\ max}^{\Sigma}$ for the internal energy of the converter 10. In nonlimiting manner, the determination module 14 includes a calculation unit 28 for calculating intermediate variables from the input variables constituted by the value of the voltage $v_g$ measured on the AC power supply network, the value of the voltage $V_{dc}$ measured on the DC power supply network, the active AC power setpoint $P_{ac}^*$, the reactive AC power setpoint $Q_{ac}^*$, and the DC power setpoint $P_{dc}^*$, and also from a set of state parameters that are known and specific to the converter 10.

In this example, the state parameters comprise the inductance $L_{arm}$ of an arm, the inductance $L_f$ and the resistance $R_f$ of a phase line, the capacitance C of the capacitors in an arm, the capacitors preferably being of identical capacitance, the maximum voltage $V_{sm\ Max}$ that is acceptable for a submodule, the number N of submodules in an arm, and the resistance $R_{IGBT}$ of the insulated gate bipolar transistors making up the switch elements T1 and T2 of each submodule.

In nonlimiting manner, the intermediate variables also include an equivalent differential current variable $I_{diff}$, representing the current flowing through the DC power supply network in a single-phase model of the converter under steady conditions, an equivalent differential voltage variable $V_{diff}$, representing the voltage under steady conditions at the terminals of the DC portion of the converter in said model, an equivalent AC internal voltage variable $V_v$, under steady conditions in said single-phase model of the converter, and an equivalent intermediate current variable $I_g$, representing the current flowing to the AC power supply network in said single-phase model of the converter, likewise under steady conditions.

The intermediate variables also include an angular frequency $\omega$, a phase variable $\theta$ for the phase difference between the voltage vector of the AC power supply network and the vector of the current flowing to the AC power supply network. The intermediate variables also include an intermediate angle variable $\delta$ representing the phase difference between the voltage vector of the AC power supply network and the equivalent AC internal voltage vector $V_v$.

On the basis of these intermediate variables, the determination module 14 is suitable for determining the instant $t_m$ at which the configuration is the most unfavorable for the converter 10 and at which the internal energy in an arm reaches the lower limit for internal energy $W_{L\ min}^{\Sigma}$. At this instant $t_m$, the voltage $v_m$ inserted into the arm is equal to the sum of the voltages $v_{c\Sigma}$ of the submodules in that arm. The determination module 14 is also suitable for determining the instant $t_r$ at which the configuration is the most unfavorable for the converter and at which the internal energy in an arm reaches the upper limit for internal energy $W_{L\ max}^{\Sigma}$.

The determination module 14 is also suitable for determining the oscillating component of the internal energy $W_{ru}^{\Sigma}(t)$ stored in the capacitors of the submodules of an upper arm of the converter. Without going beyond the ambit of the disclosure, the determination module 14 is also suitable for determining the oscillating component of the internal energy $W_{rl}^{\Sigma}(t)$ stored in the capacitors of the submodules of a lower arm of the converter. Starting from the oscillating component of the internal energy $W_{ru}^{\Sigma}(t)$, the instants $t_r$ and $t_m$, and the determined intermediate variables, the determination module 14 is suitable for determining the lower limit $W_{L\ min}^{\Sigma}$ and the upper limit $W_{L\ max}^{\Sigma}$ for the internal energy.

FIGS. 8 to 13B show two simulations of controlling the internal energy stored in the capacitors of an arm of a converter. In these figures, for greater clarity, apart from the voltage across a capacitor of a submodule, magnitudes of power, energy, and voltage are given using the per-unit system [p.u.], while time is expressed in seconds.

In particular, FIGS. 8 to 10B show a first simulation revealing the behavior of two systems when the level of internal energy is in the vicinity of the lower limit $W_{L\ min}^{\Sigma}$. FIGS. 11 to 13B show a second simulation revealing the behavior of two systems when the level of internal energy is in the vicinity of the upper limit $W_{L\ max}^{\Sigma}$.

In the first simulation, as shown in FIGS. 8 to 10B, a comparison is made between the behaviors of two systems. The first system, of behavior shown by the curves in FIGS. 9A and 9B, consists in a modular multilevel converter of the disclosure, including an internal energy control module. The second system, of behavior shown by the curves of FIGS. 10A and 10B, consists in a prior art modular multilevel converter without an internal energy control module. The internal energy of the second system is thus not regulated.

Figure 8:
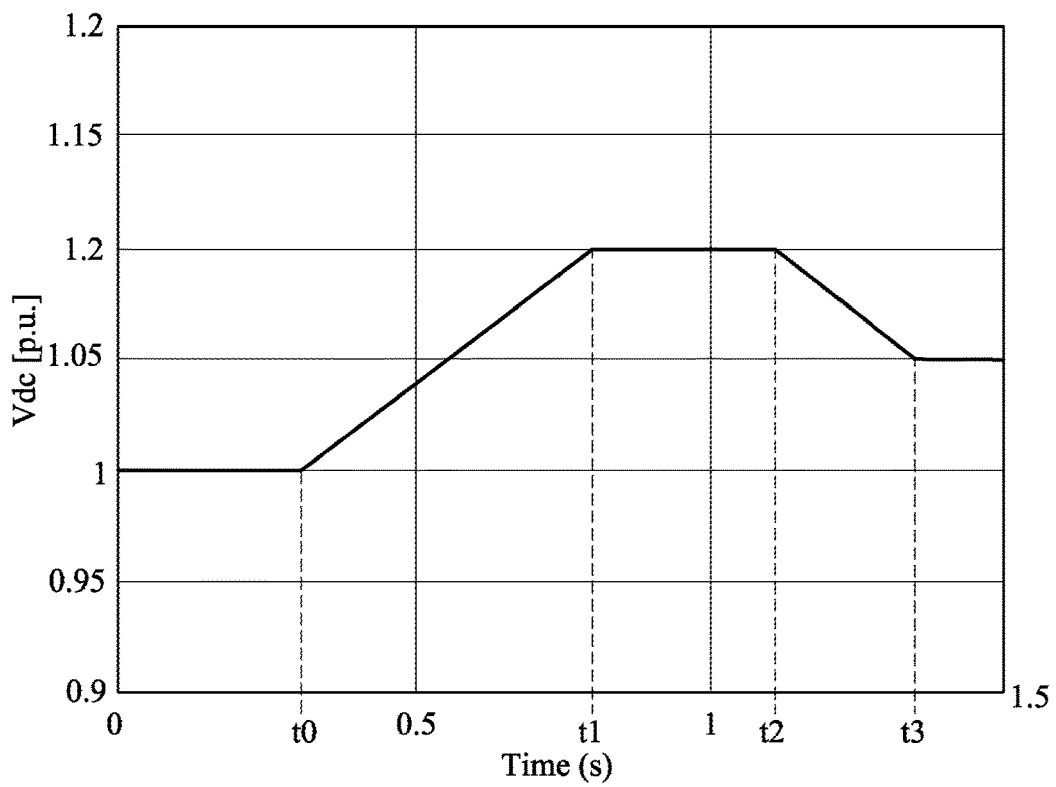
FIG. 8 shows a first simulation in which the voltage of the DC power supply network is caused to vary.

FIG. 8 shows a change as a function of time in the voltage $V_{dc}$ of the DC power supply network, and that is imposed for the needs of the simulation. The voltage $V_{dc}$ is initially subjected to an increase from an instant $t_0$ to an instant $t_1$, and then the voltage $V_{dc}$ is decreased from an instant $t_2$ to an instant $t_3$.

Figure 9A:
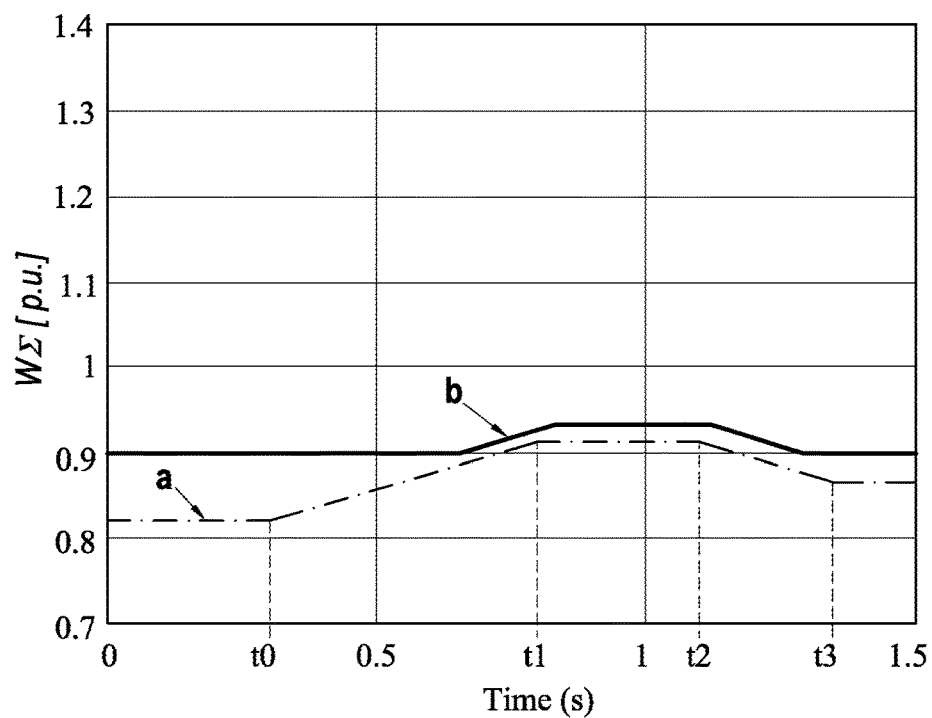
FIG. 9A shows, for a first system, how the internal energy varies close to the lower limit of a converter of the disclosure, which includes a control module, and in response to the voltage variation shown in FIG. 8.

FIG. 9A shows the variation in the mean of the internal energy stored in the capacitors of an arm of the converter 10 of the disclosure, for the first system in response to the voltage variation of FIG. 8. In this figure, the curve a represents the variation in the lower limit $W_{L\ min}^{\Sigma}$ for the internal energy as a function of time. As can be seen from the above, this limit is determined by the control module 12, and more particularly by the determination module 14. It can be seen that this lower limit $W_{L\ min}^{\Sigma}$ follows the variation in the voltage $V_{dc}$ of the DC power supply network. $V_{dc}$ is a parameter having considerable influence on the lower limit $W_{L\ min}^{\Sigma}$, such that by varying this parameter it is easy to track the variation of the internal energy stored in the capacitors of an arm of the converter 10. The lower limit $W_{L\ min}^{\Sigma}$ thus increases from the instant $t_0$ to the instant $t_1$, and then it decreases from the instant $t_2$ to the instant $t_3$.

In the example of FIG. 9A, the mean of the internal energy of the converter, as represented by the curve b, is kept at an initial reference value. When this internal energy level comes close to the lower limit $W_{L\ min}^{\Sigma}$, the control module regulates the internal energy in such a manner as to keep this level above said lower limit.

Figure 9B:
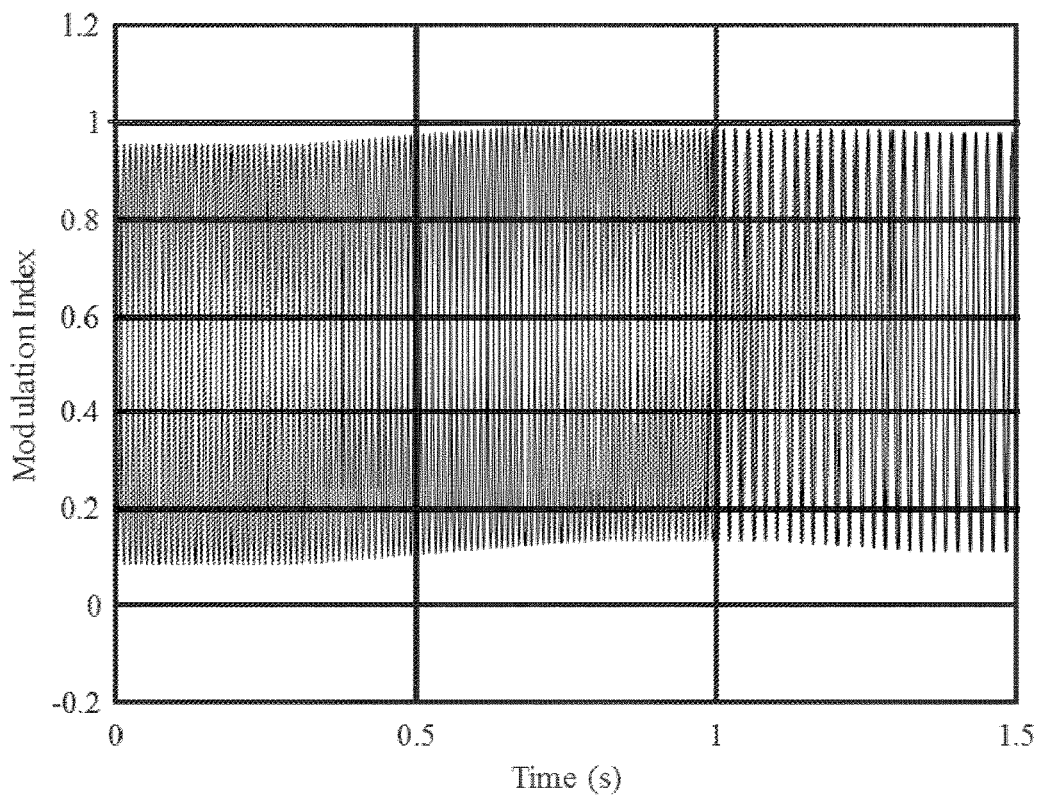
FIG. 9B shows how the modulation index varies in the converter of the disclosure of the first system of FIG. 9A.

FIG. 9B shows the variation of the modulation index m in this first system, in response to the variation of the voltage $V_{dc}$ of the DC power supply network as shown in FIG. 8. It is known that the voltage $v_m$ inserted into an arm is proportional to the voltage $V_{dc}$ of the DC power supply network. Thus, an increase in the voltage $V_{dc}$ implies an increase in the inserted voltage $v_m$, thereby leading to an increase in the modulation index m. In the example of FIG. 9B, with the internal energy of the converter being regulated by the control module, the modulation index m is kept below 1, such that the following inequality is true:

$$\frac{v_m(t)}{v_{c\Sigma}(t)} \leq 1$$

Proper operation of the converter is thus ensured.

Figure 10A:
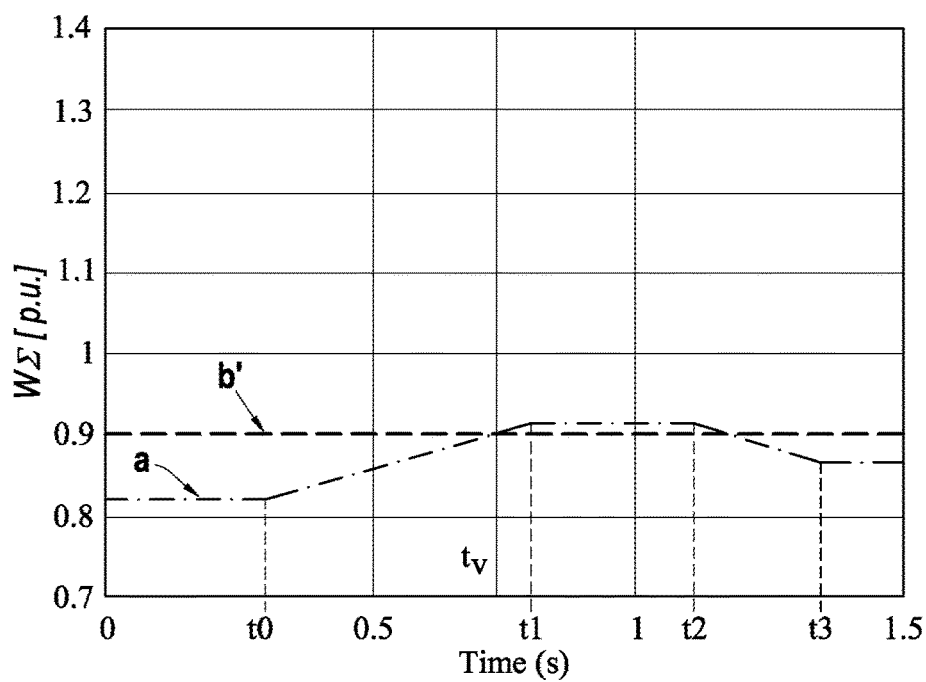
FIG. 10A shows, for a second system, how the internal energy varies close to the lower limit of a prior art MMC, which does not include a control module, and in response to the voltage variation of FIG. 8.

In FIG. 10A, there can be seen the variation, for the second system, of the mean of the internal energy stored in the capacitors of an arm of a prior art converter, in response to the FIG. 8 voltage variation.

The curve a shows the variation of the lower limit $W_{L\ min}^{\Sigma}$ for the internal energy, as determined by the control module of the first system. It can be seen that the mean of the internal energy of the converter, as plotted by the curve b', is not regulated, such that the level of this internal energy remains constant and drops below the lower limit $W_{L\ min}^{\Sigma}$ at the instant $t_v$.

Figure 10B:
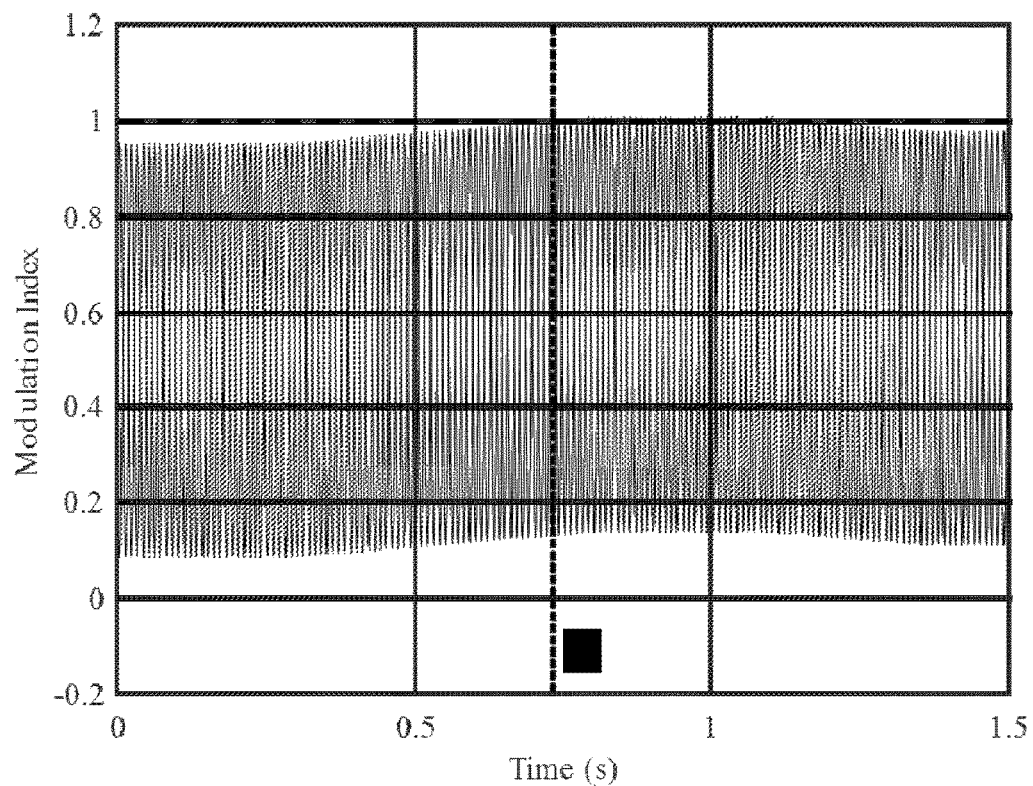
FIG. 10B shows how the modulation index varies in the prior art converter of the second system of FIG. 10A.

FIG. 10B shows the variation in the modulation index m for the second system. Since the prior art converter does not have a control module and since the internal energy of the converter is not regulated, the modulation index m is not regulated and it exceeds 1, such that the following inequality is no longer true, as from the instant $t_v$:

$$\frac{v_m(t)}{v_{c\Sigma}(t)} \leq 1$$

Proper operation of the converter is then no longer ensured and there is a risk of the converter being damaged.

It can thus be understood that, in addition to determining a lower limit $W_{L\ min}^{\Sigma}$ adapted to the state of the network, the control module 12 of the converter 10 of the disclosure as used in the nonlimiting simulation example of FIGS. 9A and 9B serves to keep the internal energy above said lower limit $W_{L\ min}^{\Sigma}$. This keeps the modulation index below 1 and ensures that the converter operates properly.

The results of the second simulation of the behavior of the converter, when the internal energy level is close to the upper limit $W_{L\ max}^{\Sigma}$, are described with reference to FIGS. 11 to 13B. In this second simulation, a comparison is made likewise between the behaviors of two systems. Once again, the first system of behavior that is shown by the curves in FIGS. 12A and 12B, consists in a modular multilevel converter of the disclosure that includes an internal energy control module. The second system, of behavior shown by the curves of FIGS. 13A and 13B, consists in a prior art modular multilevel converter without an internal energy control module. The internal energy of the second system is thus not regulated.

Figure 11:
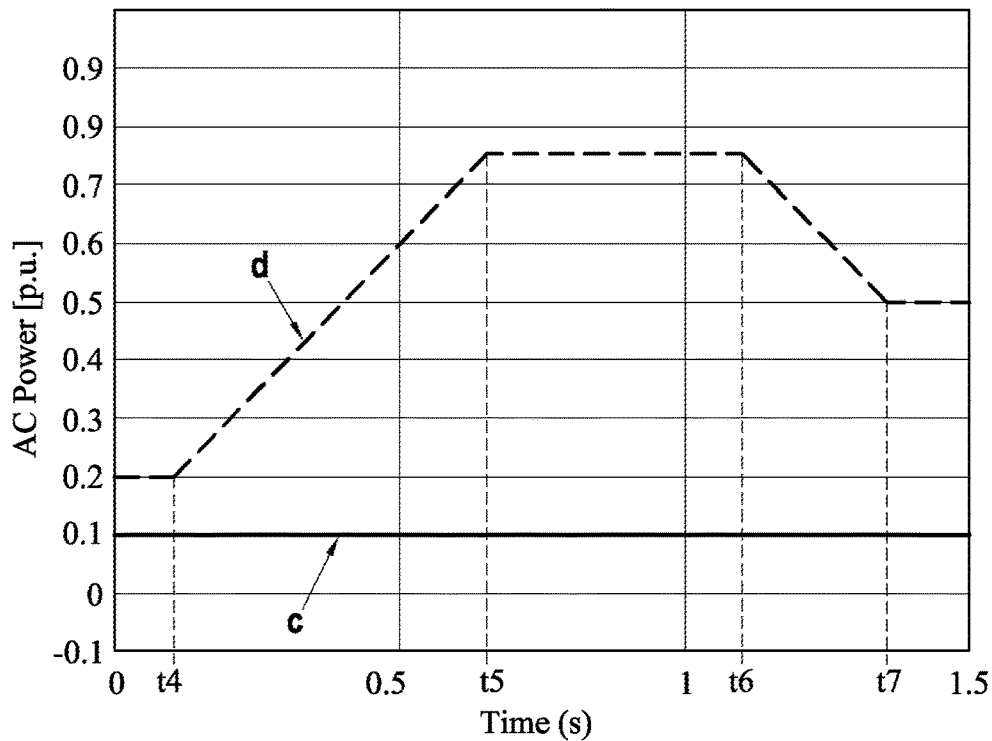
FIG. 11 shows a second simulation in which the active AC power is caused to vary.

The curve c of FIG. 11 shows the reactive AC power $Q_{ac}$ being kept constant, while the curve d shows the active AC power $P_{ac}$ as a function of time. These powers are the powers transferred between the converter and the AC power supply network. For the purposes of the simulation, the active AC power $P_{ac}$ is initially subjected to an increase from an instant $t_4$ to an instant $t_5$, and then the power $P_{ac}$ is decreased from an instant $t_6$ to an instant $t_7$.

Figure 12A:
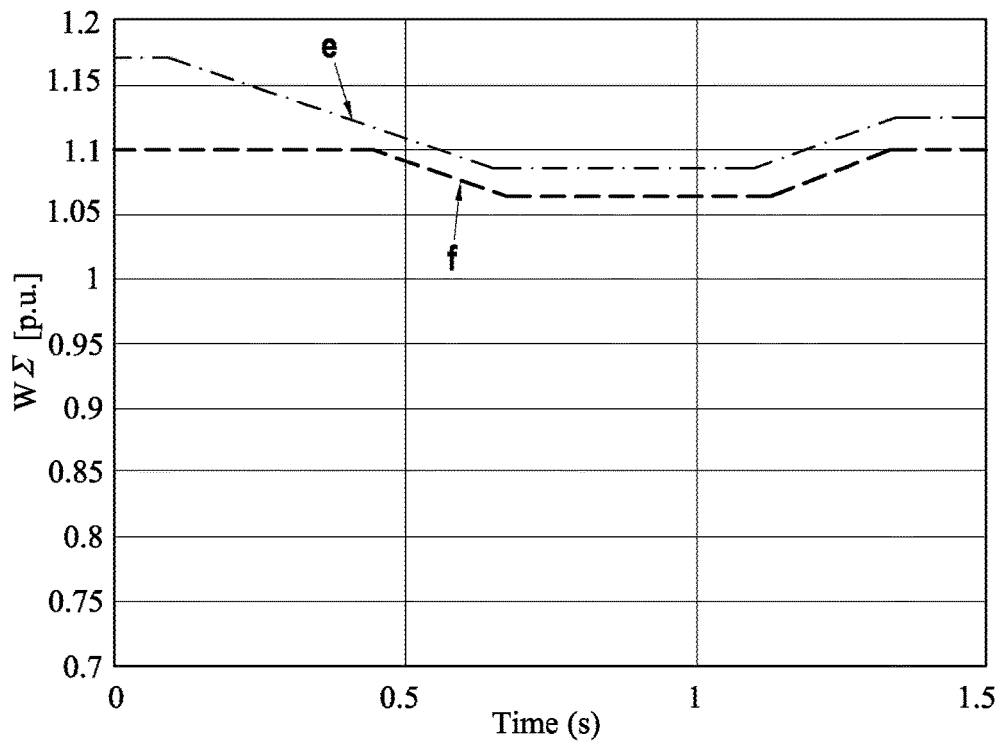
FIG. 12A shows, for a first system, how the internal energy varies close to the upper limit of a converter of the disclosure, which includes a control module, and in response to the power variation shown in FIG. 11.

FIG. 12A shows the variation in the mean of the internal energy stored in the capacitors of an arm of the converter of the disclosure, for the first system in response to the power variation of FIG. 11. In this figure, the curve e represents the variation in the upper limit $W_{L\ max}^{\Sigma}$ for the internal energy. As described above, this limit is determined in real time by the control module. It can be seen that this upper limit varies in opposite manner to the active AC power $P_{ac}$. $P_{ac}$ is a parameter having considerable influence on the upper limit $W_{L\ max}^{\Sigma}$, such that by varying this parameter it is easy to track the variation of the internal energy stored in the capacitors of an arm of the converter 10. The upper limit $W_{L\ max}^{\Sigma}$ thus decreases from the instant $t_4$ to the instant $t_5$, and then it increases from the instant $t_6$ to the instant $t_7$.

In the example of FIG. 12A, the mean of the internal energy of the converter of the first system, as represented by the curve f, is kept at an initial reference value. When the level of the internal energy comes close to the upper limit $W_{L\ max}^{\Sigma}$, the control module regulates said internal energy so as to keep the level of the internal energy below said upper limit.

Figure 12B:
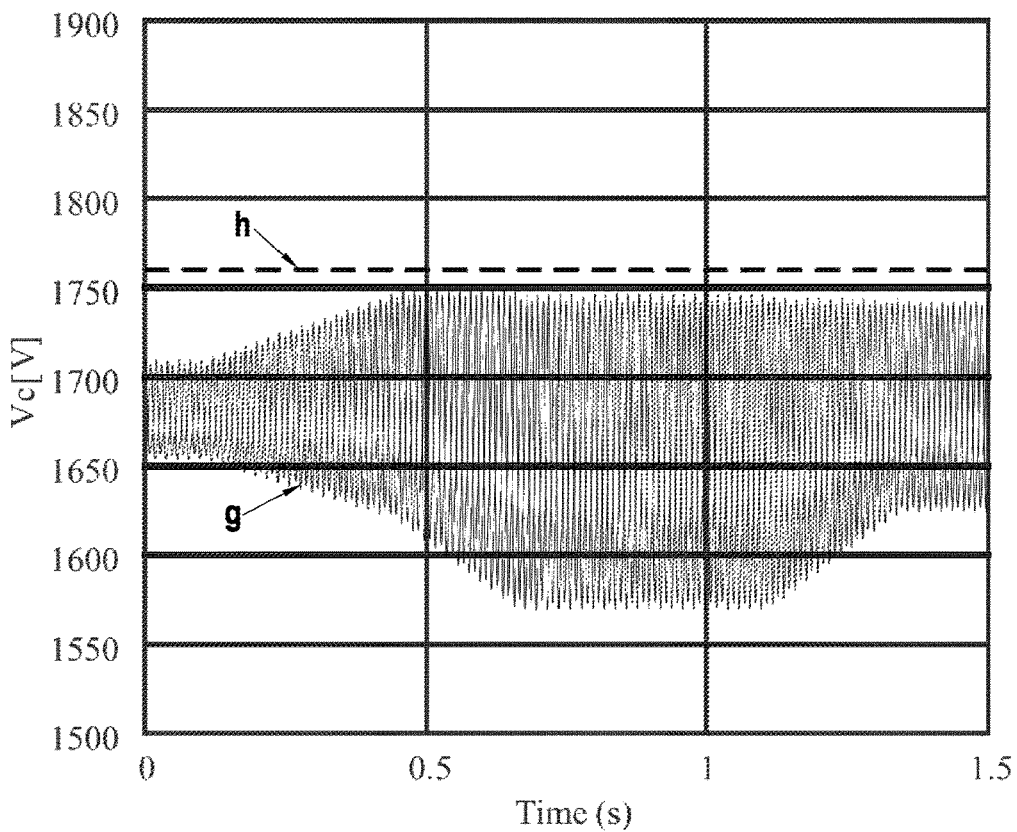
FIG. 12B shows how the voltage varies for a capacitor in a submodule of the converter of the disclosure in the first system of FIG. 12A.

Curve g in FIG. 12B shows the variation in the voltage $v_c$ of a capacitor of a submodule of the first system as a function of time, in response to the FIG. 11 power variation. The increase in the active power $P_{ac}$ and thus in the exchanges of power between the converter and the AC power supply network, leads to an increase, at the instant $t_4$, in the amplitude of the oscillations of the capacitor voltage $v_c$.

It should be recalled that in order to avoid damaging the submodule and in order to guarantee proper operation of the converter, the capacitor voltage $v_c$ must be less than a maximum voltage $V_{c\,Max}$ corresponding to the voltage limit of the switch elements of said submodule. In the example of FIG. 12B, since the internal energy of the converter of the first system is regulated by the control module, the capacitor voltage $v_c$ is regulated and peak-limited in such a manner that the voltage $v_c$, as represented by the curve g, always remains below the voltage limit $v_{c\,Max}$ of the switch elements, as represented by the curve h.

Proper operation of the converter is thus ensured and there is no risk of the submodule being damaged.

Figure 13A:
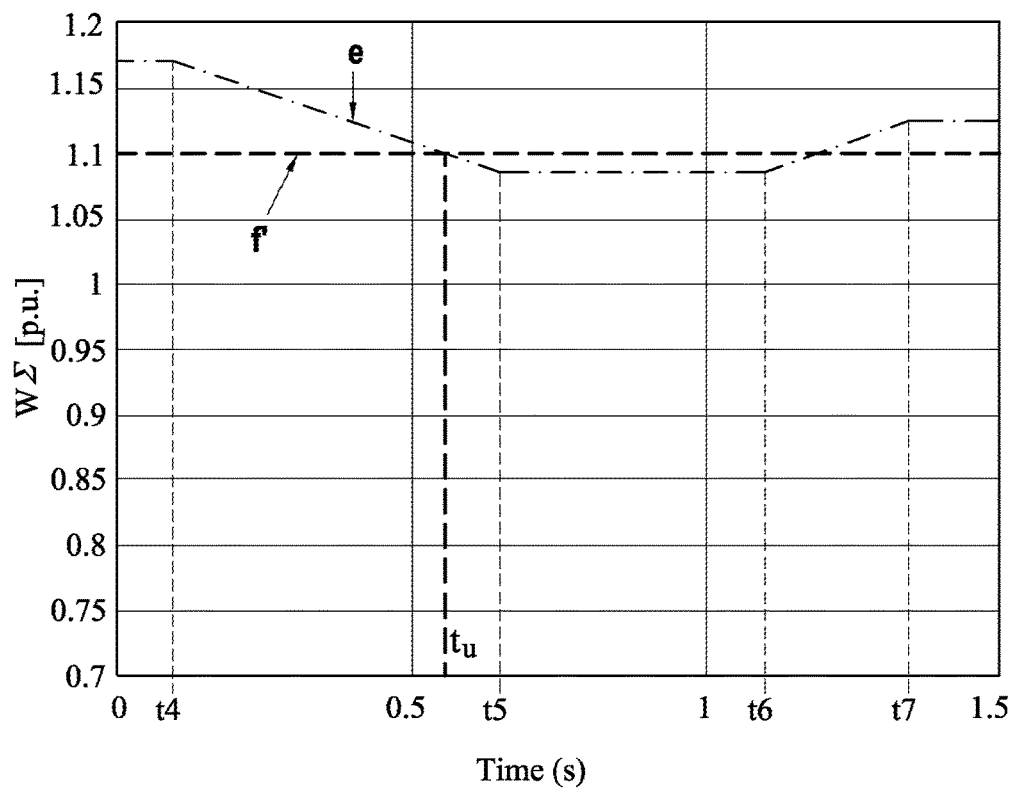
FIG. 13A shows, for a second system, how the internal energy varies close to the upper limit of a prior art MMC, which does not include a control module, and in response to the power variation of FIG. 11.

FIG. 13A shows the variation, in response to the FIG. 11 power variation, of the internal energy stored in the capacitors of an arm of the converter of the second system, which converter does not include a control module. The curve e shows the variation of the upper limit $W_{L\,max}^{\Sigma}$ for the internal energy, as determined by the control module of the first system.

It can be seen in this FIG. 13A that the level of the internal energy of the converter, as represented by the curve f' is not regulated, such that this level of the internal energy remains constant and passes above the upper limit $W_{L\,max}^{\Sigma}$ at the instant $t_{u'}$.

Figure 13B:
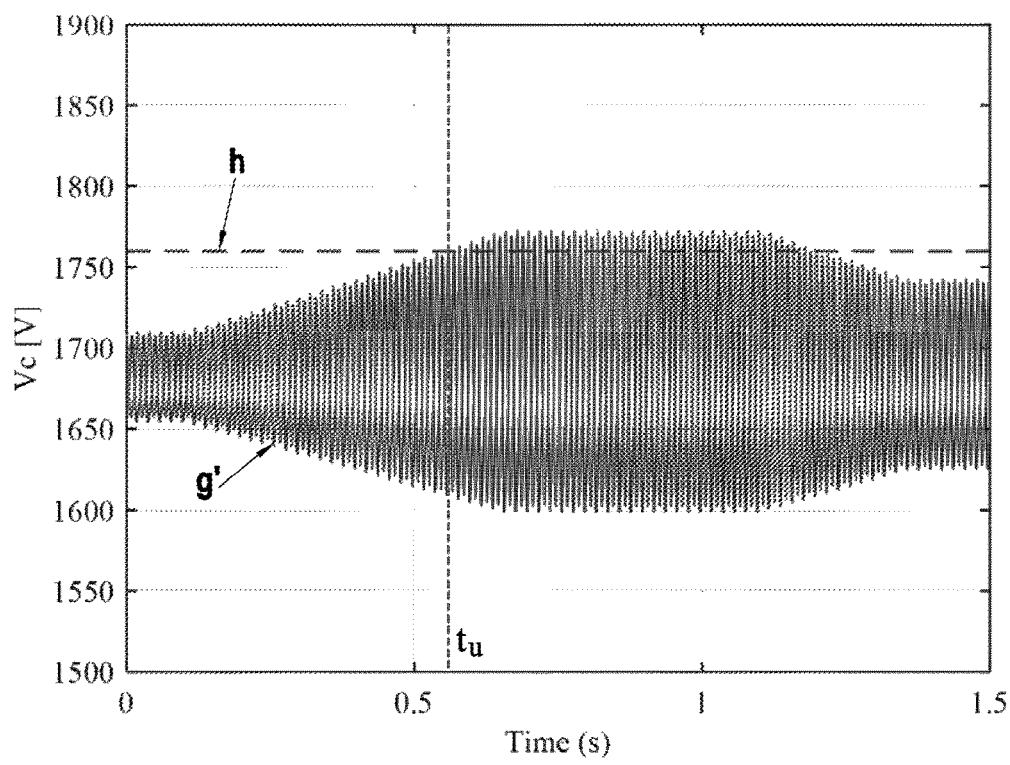
FIG. 13B shows how the voltage varies for a capacitor of a submodule of a prior art converter in the second system of FIG. 13A.

Curve g' in FIG. 13B shows the variation in the voltage $v_c$ of a capacitor of a submodule of the second system as a function of time, in response to the FIG. 11 power variation. In this example, since the converter of the second system does not have an internal energy control module, the internal energy of the converter of the second system is not regulated. Also, the capacitor voltage $v_c$ is not regulated, such that the voltage $v_c$ becomes greater than the voltage limit $V_{c\,Max}$ of the switch elements, as represented by the curve h, as from the instant $t_{u'}$.

The submodule runs the risk of being damaged and proper operation of the converter is thus no longer ensured.

It can thus be understood that in addition to determining an upper limit $W_{L\,max}^{\Sigma}$ for the internal energy that is adapted to the state of the network, the control module 12 of the converter 10 of the disclosure, as used in the nonlimiting simulation example of FIGS. 12A and 12B serves to keep the internal energy below said upper limit $W_{L\,max}^{\Sigma}$. This keeps the voltage $v_c$ below the voltage limit $V_{c\,Max}$ of the switch elements.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances. Although the present disclosure herein has been described with reference to particular embodiments, it is to be understood that these embodiments are merely illustrative of the principles and applications of the present disclosure.

Further, although some features, concepts or aspects of the embodiments of the disclosure may be described herein as being a preferred or advantageous arrangement or method, such description is not intended to suggest that such feature or features are required or necessary unless expressly so stated.

It is intended that the specification and examples be considered as exemplary only, with a true scope of the disclosure being indicated by the following claims.

The invention claimed is:

1. A modular multilevel voltage converter for converting an AC voltage into a DC voltage, and vice versa, the converter comprising:
   a DC portion for connection to a DC power supply network; and
   an AC portion for connection to an AC power supply network;
   a plurality of legs, each leg comprising an upper arm and a lower arm, each arm comprising a plurality of submodules that are individually controllable by a control member specific to each submodule, and each submodule comprising a capacitor, each of the capacitors being connectable in series in the arm when the control member of the submodule is in an "on" state; and
   a control module configured to regulate an internal energy stored in the capacitors of the submodules of an upper or lower arm of the converter, the control module being suitable for limiting said internal energy to below an upper limit and/or to above a lower limit, by using parameters measured on the DC power supply network and on the AC power supply network together with setpoints for the operating power of the converter.

2. The converter according to claim 1, wherein said parameters measured on the DC power supply network and on the AC power supply network comprise a voltage value $v_g$ measured on the AC power supply network and a voltage value $V_{dc}$ measured on the DC power supply network.

3. The converter according to claim 1, wherein the setpoints for the operating power of the converter comprise an active AC power setpoint $P_{ac}^*$, a reactive AC power setpoint $Q_{ac}^*$, and a DC power setpoint $P_{dc}^*$.

4. The converter according to claim 3, wherein said parameters measured on the DC power supply network and on the AC power supply network comprise a voltage value $v_g$ measured on the AC power supply network and a voltage value $V_{dc}$ measured on the DC power supply network, and wherein the control module is configured to calculate intermediate variables as a function of said parameters measured on the DC power supply network and on the AC power supply network and also as a function of said setpoints for the operating power of the converter.

5. The converter according to claim 4, wherein the intermediate variables include an equivalent differential current variable $I_{diff}$, representing a contribution of one phase in a balanced three-phase system to a current of the DC power supply network under steady conditions, as determined by means of the function:

$$I_{diff} = \frac{P_{dc}}{3V_{dc}}.$$

6. The converter according to claim 5, wherein the intermediate variables include an equivalent differential voltage variable $V_{diff}$, representing the voltage across terminals of the DC portion of the converter under steady conditions, as determined by means of the function:

$$V_{diff} = \frac{V_{dc}}{2} - I_{diff} R_{arm}$$

where $R_{arm}$ is a resistance in an arm of the converter.

7. The converter according to claim 5, wherein the control module is configured to determine an oscillating component $W_{ru}^{\Sigma}(t)$ of the internal energy stored in capacitors of an upper arm of the converter by means of the function:

$$W_{ru}^{\Sigma}(t) = \\ -\frac{\sqrt{2}\, I_{diff} V_v}{\omega}\sin(\omega t + \delta) + \frac{\sqrt{2}\, I_g V_{diff}}{2\omega}\sin(\omega t + \theta) - \frac{I_g V_v}{4\omega}\sin(2\omega t + \delta + \theta)$$

where $\omega$ is angular frequency.

8. The converter according to claim 7, wherein the control module is configured to determine the oscillating component $W_{L\,min\,u}^{\Sigma}$ of the internal energy stored in the capacitors of the submodules of an upper arm of the converter by means of the function:

$$W_{Lminu}^{\Sigma} = \frac{C_{tot}}{2}\left(V_{diff} - \sqrt{2}\, V_v \cos(\omega t_m + \delta)\right)^2 - W_{ru}^{\Sigma}(t_m)$$

where $C_{tot}$ is a sum of the capacitances of the capacitors in the upper arm and where $t_m$ is a determined instant at which the internal energy in the upper arm reaches a lower limit $W_{L\,min\,u}^{\Sigma}$, with this instant being obtained by the formula:

$$t_m = \frac{1}{\omega}\left(\pi - \sin^{-1}\left(\frac{I_{diff}}{\sqrt{A_t^2 + B_t^2}}\right) - \tan^{-1}\left(\frac{B_t}{A_t}\right)\right) + \frac{2k\pi}{\omega}$$

with:

$$A_t = \sqrt{2}\,\omega C_{tot} V_v \cos\delta + \frac{I_g}{\sqrt{2}}\sin\theta$$

$$B_t = \sqrt{2}\,\omega C_{tot} V_v \sin\delta - \frac{I_g}{\sqrt{2}}\cos\theta.$$

9. The converter according to claim 7, wherein the control module is configured to determine the upper limit $W_{L\,max\,u}^{\Sigma}$ for the internal energy stored in the capacitors of the submodules of an upper arm of the converter by means of the function:

$$W_{Lmaxu}^{\Sigma} = \frac{C_{tot}}{2}(N V_{smMax})^2 - W_{ru}^{\Sigma}(t_r)$$

where $C_{tot}$ is a sum of the capacitances of the capacitors in the arm, $V_{sm\,Max}$ is the maximum voltage that is acceptable in a submodule, N is a number of submodules in the arm, and where $t_r$ is a determined instant at which the internal energy in the arm reaches the upper limit $W_{L\,max\,u}^{\Sigma}$, with this instant being obtained by the formula:

$$t_r = \frac{1}{\omega}\left(\cos^{-1}\left(-\frac{\sqrt{2}\, I_{diff}}{I_g}\right) - \theta\right) + \frac{2k\pi}{\omega}.$$

10. The converter according to claim 4, wherein the intermediate variables include an equivalent intermediate current variable $I_g$ representing a current flowing to the AC electrical power supply network under steady conditions, as determined by the function:

$$I_g = \frac{\sqrt{P_{ac}^2 + Q_{ac}^2}}{3 V_g}$$

where $V_g$ represents a voltage of the AC power supply network under steady conditions.

11. The converter according to claim 4, wherein the intermediate variables also include a phase shift variable $\theta$ for a phase difference between a voltage vector of the AC power supply network and a vector of the current flowing to the AC power supply network.

12. The converter according to claim 4, wherein the intermediate variables include an intermediate angle variable $\delta$, representing a phase difference between the voltage vector of the AC power supply network under steady conditions and a vector of an equivalent AC internal voltage synthesized by the converter under the steady conditions, $\delta$ being determined by means of the function:

$$\delta = \tan^{-1}\frac{X_{eq} P_{ac} - R_{eq} Q_{ac}}{R_{eq} P_{ac} + X_{eq} Q_{ac} + 3 V_g^2}$$

where $V_g$ is a voltage of the AC power supply network under the steady conditions, $R_{eq}$ is an equivalent resistance in an arm, and $X_{eq}$ is an equivalent reactance in an arm.

13. The converter according to claim 4, wherein the intermediate variables include an equivalent AC internal voltage variable $V_v$ as synthesized by the converter under steady conditions by means of the function:

$$V_v = \sqrt{\left(\frac{R_{eq} P_{ac} + X_{eq} Q_{ac}}{3 V_g} + V_g\right)^2 + \left(\frac{X_{eq} P_{ac} - R_{eq} Q_{ac}}{3 V_g}\right)^2}$$

where $V_g$ is a voltage of the AC power supply network under the steady conditions, $R_{eq}$ is an equivalent resistance in an arm, and $X_{eq}$ is an equivalent reactance in an arm.

14. The converter according to claim 3, wherein said parameters measured on the DC power supply network and on the AC power supply network comprise a voltage value $v_g$ measured on the AC power supply network and a voltage value $V_{dc}$ measured on the DC power supply network, and wherein the control module includes a determination module for determining said lower limit and said upper limit for the internal energy stored in the capacitors of the submodules of an upper or lower arm as a function of said voltage value $v_g$ as measured on the AC power supply network, of said voltage value $V_{dc}$ as measured on the DC power supply network, of said active AC power setpoint $P_{ac}^*$, of said reactive AC power setpoint $Q_{ac}^*$, and of said DC power setpoint $P_{dc}^*$.

15. The converter according to claim 1, wherein the control module includes a correction module for correcting an internal energy setpoint as a function of said upper limit and of said lower limit, as supplied by the control module.

16. The converter according to claim 1, wherein the control module includes a regulator for regulating the internal energy of the converter, having as input an internal energy setpoint for the converter, and delivering a power setpoint for the capacitors of said converter.

17. The converter according to claim 1, wherein the control module includes a regulator for regulating a power at the connection points between the converter and the AC network, having as inputs an AC active power setpoint $P_{ac}^*$ and an AC reactive power setpoint $Q_{ac}^*$, and delivering an AC current setpoint $i_{gd}^*$ and an AC current setpoint $i_{gq}^*$.

18. The converter according to claim 1, wherein the control module includes a regulator for regulating a power at the connection points between the converter and the DC network, having as input a DC power setpoint $P_{dc}^*$, and delivering a differential current setpoint $i_{diff}^*$.

19. The converter according to claim 1, wherein the control module includes a regulator for regulating an AC current $i_g$ of the AC power supply network, having as inputs an AC current setpoint $i_{gd}^*$ and an AC current setpoint $i_{gq}^*$ that are associated with the AC current $i_g$, and supplying as output an equivalent AC internal voltage setpoint $v_v^*$.

20. The converter according to claim 1, wherein the control module includes a regulator for regulating the differential current $i_{diff}$, having as input a differential current setpoint $i_{diff}^*$ associated with a differential current $i_{diff}$ and supplying as output a differential voltage setpoint $v_{diff}^*$.

21. A method of controlling a modular multilevel voltage converter for converting an AC voltage into a DC voltage, and vice versa, the converter comprising
 a DC portion for connection to a DC power supply network,
 an AC portion for connection to an AC power supply network,
 a plurality of legs, each leg comprising an upper arm and a lower arm, each arm comprising a plurality of submodules that are individually controllable by a control member specific to each submodule, and each submodule comprising a capacitor, each of the capacitors being connectable in series in the arm when the control member of the submodule is in an "on" state,
the method comprising;
regulating an internal energy stored in the capacitors of the submodules of an upper or lower arm of the converter, in which said internal energy is limited to below an upper limit and/or to above a lower limit, by using parameters measured on the DC power supply network and on the AC power supply network, together with setpoints for an operating power of the converter.

* * * * *